(12) United States Patent  
Barber et al.

(10) Patent No.: US 9,355,165 B2
(45) Date of Patent: May 31, 2016

(54) METHOD AND SYSTEM FOR PERFORMING DATA MANIPULATIONS ASSOCIATED WITH BUSINESS PROCESSES AND OPERATIONS

(76) Inventors: Paul Grant Barber, Mississauga (CA); Robert John Walker, Mississauga (CA)

(*) Notice: Subject to any disclaimer, the term of this patent is extended or adjusted under 35 U.S.C. 154(b) by 923 days.

(21) Appl. No.: 12/059,070

(22) Filed: Mar. 31, 2008

(65) Prior Publication Data

US 2009/0248726 A1 Oct. 1, 2009

(51) Int. Cl.
*G06F 7/00* (2006.01)
*G06F 17/00* (2006.01)
*G06F 17/30* (2006.01)

(52) U.S. Cl.
CPC .... *G06F 17/30592* (2013.01); *G06F 17/30333* (2013.01)

(58) Field of Classification Search
CPC .............. G06F 17/30536; G06F 17/30554; G06F 17/30445; G06F 17/30545; G06F 17/30309; G06F 17/30463; G06F 17/30539; G06F 17/30398; G06F 17/30592
See application file for complete search history.

(56) References Cited

U.S. PATENT DOCUMENTS

| 6,480,842 | B1* | 11/2002 | Agassi et al. | |
| 6,567,814 | B1* | 5/2003 | Bankier et al. | |
| 6,768,986 | B2* | 7/2004 | Cras et al. | |
| 6,931,418 | B1* | 8/2005 | Barnes | 707/776 |
| 7,664,777 | B2* | 2/2010 | Cras et al. | 707/600 |
| 2003/0195898 | A1* | 10/2003 | Agarwal et al. | 707/103 R |
| 2004/0193598 | A1* | 9/2004 | Kan et al. | 707/6 |

* cited by examiner

*Primary Examiner* — Susan Chen
(74) *Attorney, Agent, or Firm* — Bennett Jones LLP

(57) ABSTRACT

A method and apparatus for accessing, processing and manipulating data in an OLAP database. According to one aspect, the present invention comprises a user interface configured for accessing, processing and manipulating data in an OLAP cube. According to another aspect, the present invention comprises a calculation engine for manipulating and managing data in the OLAP cube.

33 Claims, 22 Drawing Sheets

METHOD AND SYSTEM FOR PERFORMING DATA MANIPULATIONS ASSOCIATED WITH BUSINESS PROCESSES AND OPERATIONS

FIELD OF THE INVENTION

The present invention relates to computer systems and more particularly, to a method and system for performing data manipulations and data processing associated with financial and/or operational data stored in a database.

BACKGROUND OF THE INVENTION

Online analytical processing or OLAP is a technique in business intelligence applications and comprises providing answers to analytical queries that are multidimensional in nature. Examples of OLAP applications include business reporting for sales, marketing, management reporting, business process management, budgeting and forecasting, financial reporting and the like.

Databases configured for OLAP applications typically comprise a multidimensional data model, often referred to as a "cube". A multidimensional data model allows for complex analytical queries with rapid execution time. The cube structure comprises aspects of navigational databases and hierarchical databases.

An OLAP cube can be thought of as an extension of the two-dimensional array of a spreadsheet, and comprises dimensions. In the context of an OLAP cube, dimensions provide additional methods for analyzing data. For example, an OLAP cube can be configured to allow a company to analyze financial data by product, by time-period, by city, by type of revenue and cost, and by comparing actual data with a budget. In a further aspect, a user, for example, a financial analyst, may want to view the data in various ways, such as displaying all the cities down the page and all the products across a page. This could be for a specified period, version and type of expenditure. Having seen the data in this particular way the analyst might then immediately wish to view it in another way. The cube structure provides the capability to re-orient the display so that the data displayed now had periods across the page and type of cost down the page. Because this re-orientation involved re-summarizing very large amounts of data, this new view of the data had to be generated efficiently to avoid wasting the analyst's time, i.e. within seconds, rather than the hours a relational database and conventional report-writer might have taken.

According to another aspect, data in a cube may be updated at times, perhaps by different people. Techniques are therefore often needed to lock parts of the cube while one of the users is writing to it and to recalculate the cube's totals. Other facilities may allow an alert that shows previously calculated totals are no longer valid after the new data has been added, but some products only calculate the totals when they are needed.

It will be appreciated that while an OLAP cube provides a flexible and multidimensional structure data model, there remains a need in the art for improvements, such as, applications including data acquisition and processing techniques capable of exploiting the capabilities of an OLAP cube.

SUMMARY OF THE INVENTION

The present invention provides a method and system for accessing data, configuring data processing and manipulations involving the data. According to an embodiment, the data comprises information associated business processes and operations stored in an OLAP database.

According to one aspect, there is provided a system for processing data in an OLAP database, the system comprises: a user interface module; a calculation engine; the user interface comprising a screen configured for specifying a data process to be performed on data in the OLAP database in response to one or more user inputs; and the calculation engine being configured to interface to the OLAP database and execute the data process and generate a data process output.

According to another aspect, there is provided a computer-implemented method for processing data stored in an OLAP cube, the method comprises the steps of: characterizing data in the OLAP cube according to a common dimension, and the common dimension comprising one or more common dimension members; characterizing data in the OLAP cube according to a non-common dimension, and the non-common dimension comprising one or more non-common dimension members; specifying a combination comprising selected common dimension members and selected non-common dimension members; selecting cells in the OLAP cube based on the specified combination, and reading data from the selected cells; applying a processing operation to the data read from the selected cells; and writing data from the processing operation back to the OLAP cube.

According to a further aspect, there is provided a computer program product for processing data in an OLAP database, the computer program product comprises: a storage medium configured to store computer readable instructions; the computer readable instructions including instructions for, characterizing data in the OLAP cube according to a common dimension, and the common dimension comprising one or more common dimension members; characterizing data in the OLAP cube according to a non-common dimension, and the non-common dimension comprising one or more non-common dimension members; specifying a combination comprising selected common dimension members and selected non-common dimension members; selecting cells in the OLAP cube based on the specified combination, and reading data from the selected cells; applying a processing operation to the data read from the selected cells; and writing data from the processing operation back to the OLAP cube.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which.

Like reference numerals indicate like or corresponding elements or components in the drawings.

DETAILED DESCRIPTION OF THE EMBODIMENTS OF THE INVENTION

Figure 1:
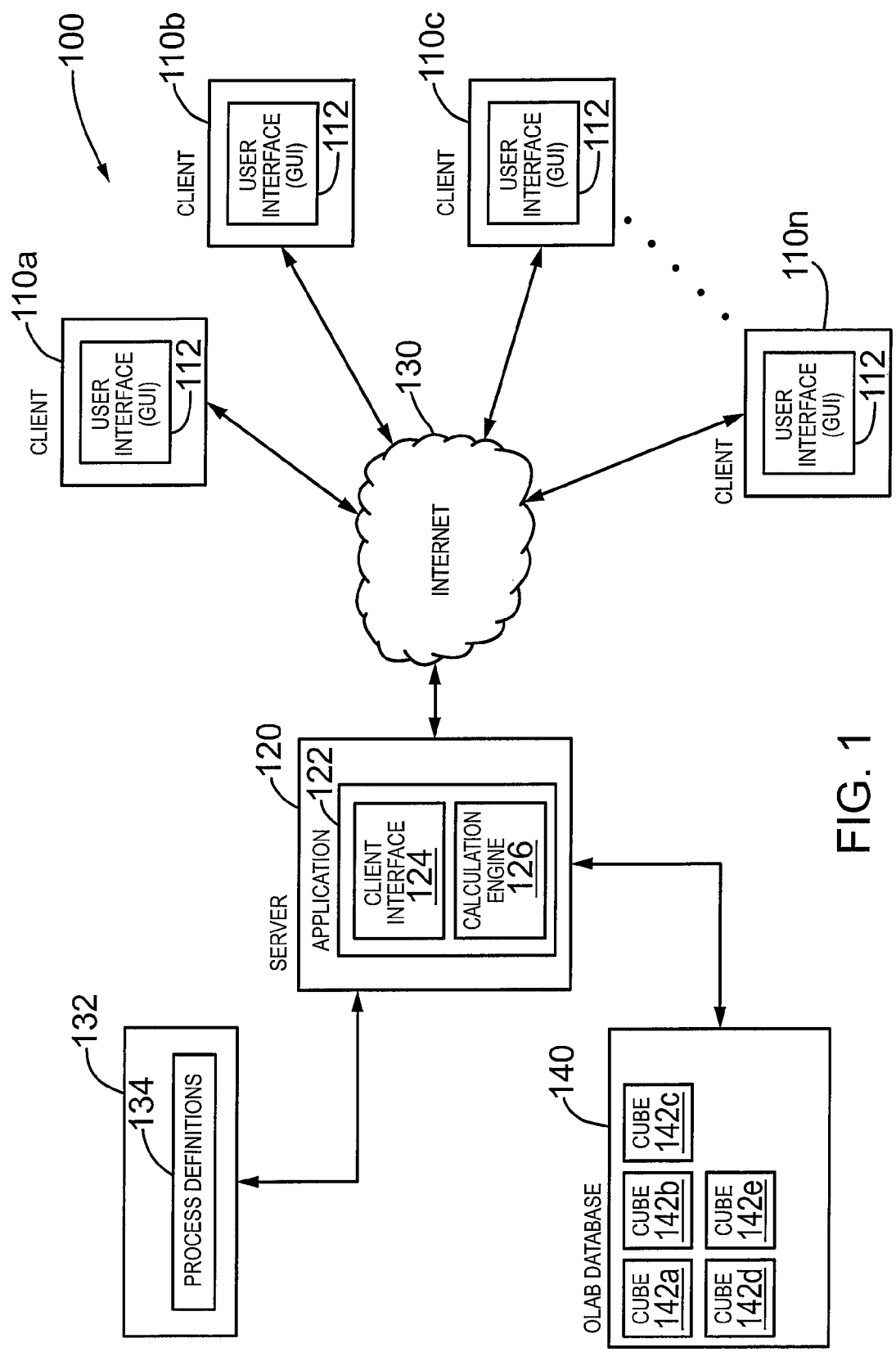
FIG. 1 shows in diagrammatic form an exemplary system for operating or executing methods or processing in accordance with an embodiment of the invention.

Embodiments according to the present invention are described in the context of data or information used by companies for planning, budgeting, monthly financial reporting and/or consolidation of financial results. In the context of the present description, numerical data is stored in an OLAP database, and comprises one or more cubes. Each cube comprises a structure based on dimensions and members.

The cubes and dimensions will vary from company to company. In addition, the names of dimensions within cubes can vary. For instance, a cube can have dimensions named "Accounts", "Versions" and "Time", and a number of other dimensions with other names. Each dimension comprises a list of members. For example, an "Organization" dimension in a cube comprises a list of departments and reporting entities for a company. The dimensions can also have a calculation structure that describes data aggregation, e.g. 'East Region'='New York' plus 'Boston', or a calculation structure that describes a more complex calculation, e.g. 'Benefits'=10% of 'Salaries'. It will be appreciated that calculations can also be different for each company.

In the context of the present description, data is stored in an OLAP database as a single numerical value for each dimension combination. For example, if the dimensions are 'Time', 'Accounts', 'Version' and 'Organization', each of which has a member called 'Jan08', 'Salaries', 'Plan' and 'Boston' respectively, then one numeric value is stored for this combination of members. Similarly, a different number is stored in the database for 'Feb08', 'Salaries', 'Plan' and 'Boston'.

Typically, data is accessed (i.e. imported) in an OLAP database at a detailed level, for example, using the 'Time', 'Accounts', 'Version' and 'Organization' dimensions (e.g. 'Jan08', 'Salaries', 'Plan' and 'Boston'). The data is then processed and reported at an aggregated level to provide historical information, for example, according to the dimensions, 'Total Year', 'Total Expenses', 'Plan' and 'Total Company'.

As will be described in more detail below, the present invention comprises embodiments of a system and method for accessing data in an OLAP database or cube, configuring operations (i.e. data processes) to process the data, and configuring manipulations involving the data.

In the context of the present description, a process generally refers to data manipulation operations, and is referred to as "processes" or "data processes". A typical process involves collecting data within a cube, performing an operation on it (e.g. an allocation, averaging or increasing/decreasing the amounts) and then storing data back in the cube. As will be described in more detail below, the present invention according to one aspect provides a structured approach and generalized interface configured for performing operations, such as, data collection, aggregation and storage, and combinations thereof, according to a variety of customer needs without the need for customization. According to a further aspect, the capability to handle exception conditions or customer specific operations is provided. Process in the context of the present description will also refer to a computer-implemented process (i.e. a computer function or software configuration) to execute an algorithm or perform other computer-implemented or configured operations or functions.

In accordance with embodiments of the present invention a system and techniques (e.g. computer-implemented processes) are described in more detail below for accessing data in an OLAP database and configuring processes for manipulating and processing the data.

Reference is made to FIG. 1, which shows in diagrammatic form an exemplary operating environment and configuration for a system and processes according to embodiments of the present invention. The operating environment according to an embodiment and indicated generally by reference 100 comprises a client/server configuration. As shown, one or more clients 110, indicated individually by references 110a, 110b, 110c, . . . 100n, access a server indicated by reference 120, for example, through a network 130. The network 130 may comprise a local area network (LAN), a wide area network (WAN), the Internet or any combination thereof. As shown the server 120 interfaces with a database 140. According to an embodiment, the database 140 is configured as an OLAP database and comprises a number of cubes 142, indicated individually by references 142a, 142b, 142c, 142d, 142e, . . . . The cubes 142 are configured with dimensions and members as described above and in further detail below.

According to an embodiment, the system 100 includes a storage module indicated generally by reference 134. The storage module 134 is configured to store data process definitions, for example, as defined by a user. According to an embodiment, the storage module 134 is implemented using a relational data structure or configuration.

As shown in FIG. 1, the server 120 is configured with an application indicated generally by reference 122. According to an embodiment, the application 122 comprises a client interface module 124 and a calculation engine module 126.

The client interface module 124 is configured to provide an interface with the client machines 110. According to an embodiment, the client interface module 124 is implemented with a user interface or GUI (Graphical User Interface) which runs on each of the client machines 110 as indicated generally by reference 112. According to an embodiment, the client interface module 124 and the user interface 112 comprise logic and processes configured to provide a user with the capability to specify a processing request for data in the database 140, i.e. a process for querying structural component(s) associate with one of the cubes. According to an embodiment, the application 122 includes a module for storing processes specified by a user in the database, for example, in the storage module 134.

The calculation engine module 126 comprises a computer-implemented process(es) or function(s) that runs on the server 120 and performs manipulation of data in the cube 142 according to a specification, i.e. a data process specified and provided by the user through the user interface 112. According to an embodiment, the execution of a data process is independent of the specification of the data process. For example, a data process can be executed multiple times and the execution of a data process can be scheduled to run at any time. According to an embodiment, the calculation engine is configured to execute process definition(s) retrieved or returned from the storage module 134.

For example, the system and method according to the present invention provides the capability for accessing and/or manipulating data in an OLAP database in order to generate information for planning and reporting purposes. Typical examples include the following:

for each product, calculate monthly 2009 planned unit sales to be 10% greater than the monthly average for January thru September of 2008 for each product, calculate monthly material unit costs in 2009 to be 15% greater than the average in Quarter 3 of 2008 for a new product, the 2009 price for customers in the Eastern US is $100; in the West it is $110 for the optimistic scenario, increase the planned units sold by 100,000 for the whole of 2009, preserving the seasonality and the spread across branches.

for each month, take the total actual costs of the IT department and allocate them to lines of business based on number of computers in each department.

Create a corresponding reversing entry in the IT department in a reforecast, assume costs for July 2009 to December 2009 will be the same as in the budget, except in the Atlanta branch where they will be $100,000 less than budget.

The functionality, logic and processes associated with the client interface module 124 and the user interfaces 110 are described in more detail below according to embodiments of the invention. Embodiments of processing modules and functionality of the calculation engine module 126 are also described in more detail below.

In the context of the processes and operations associated with the application 122, i.e. the client interface 124 and the calculation engine 126, "Common Dimensions" are defined as dimensions within which data is not manipulated. The selected members of Common Dimensions determine the member combinations for which data manipulation will take place. For example, if the only Common Dimensions are Time and Products and the selected members are "January; February; March" and "Widgets; Grommets" respectively, then data manipulation will take place for each of the 6 combinations "January, Widgets", "February, Widgets", "March, Widgets", "January, Grommets", "February, Grommets" and "March, Grommets".

Source/target dimensions are dimensions within which data is manipulated. The selected source members of Source/Target Dimensions determine the member combinations for which data will be read from the cube. Selected Source dimension members can be calculated, for example, data can be copied from "Total Company" even if Total Company" is the aggregation of many departments. The selected target members of Source/Target Dimensions determine the member combinations for which data will be written back to the cube. Selected Target dimension members must be editable, i.e. leaf members, or non-calculated members into which data can be stored. In the context of the present description, a Source/Target dimension may be referred to as either a Source Dimension or a Target Dimension. Target Dimensions may be further subdivided into Time Target Dimensions and Non-Time Target Dimensions. If Time is a Target Dimension, the Time Target Dimension is the Time Dimension; otherwise it is the NULL dimension. The Non-Time Target Dimension comprises all Target Dimension except the Time Target Dimension.

In accordance with this convention or notation, the address of a data cell or tuple comprises one of the following:

(1) a "Common Dimension" member combination and a "Source Dimension" member combination;

(2) a "Common Dimension" member combination and a "Target Dimension" member combination;

(3) a "Common Dimension" member combination, a "Time Target Dimension" member combination (i.e. either NULL or a single member of the Time Dimension) and a "Non-Time Target Dimension" member combination;

(4) a "Common Dimension" member combination when all dimensions are Common Dimensions, for example, when the operation being performed is "Storing single data value".

The configuration and operation of the calculation engine 126 and the system 100 is now described in further detail with reference to the user interface depicted in FIGS. 2 to 6.

Figure 2:
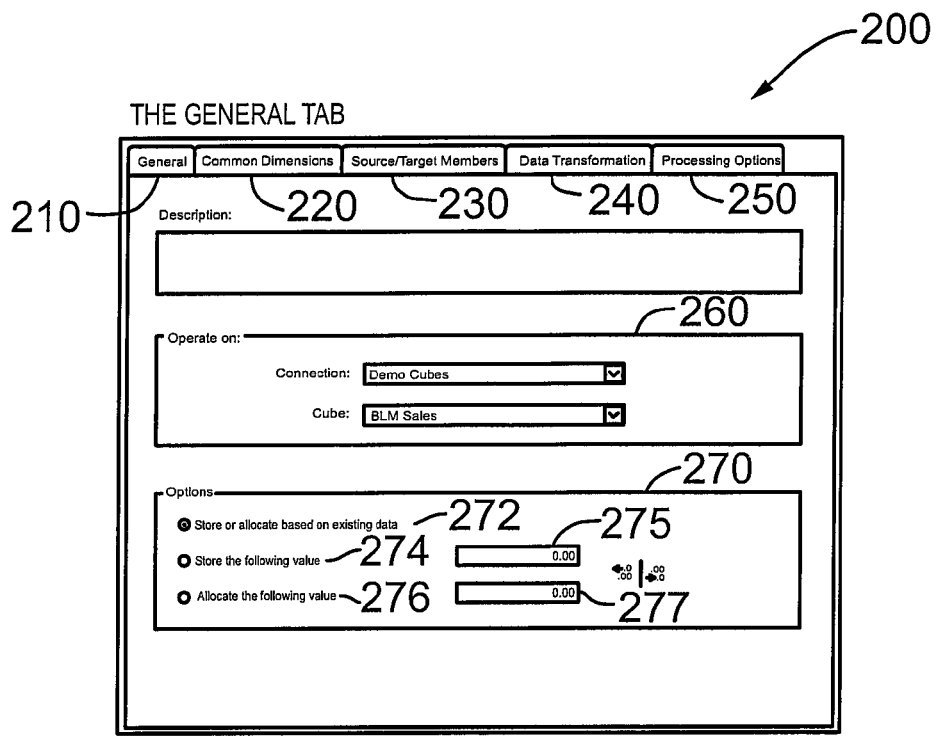
FIG. 2 is an exemplary screen shot of a process configured to specify a cube and one or more operations associated with the cube, according to an embodiment of the invention.
Figure 3:
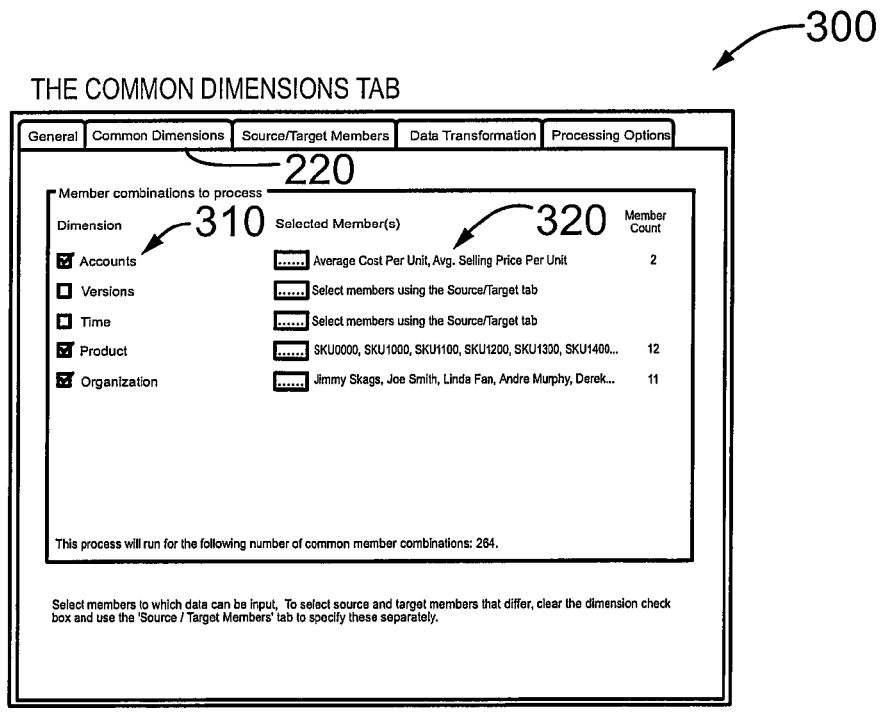
FIG. 3 is an exemplary screen shot of a process configured to select common dimensions and/or dimensions for a cube in accordance with an embodiment of the invention.
Figure 4:
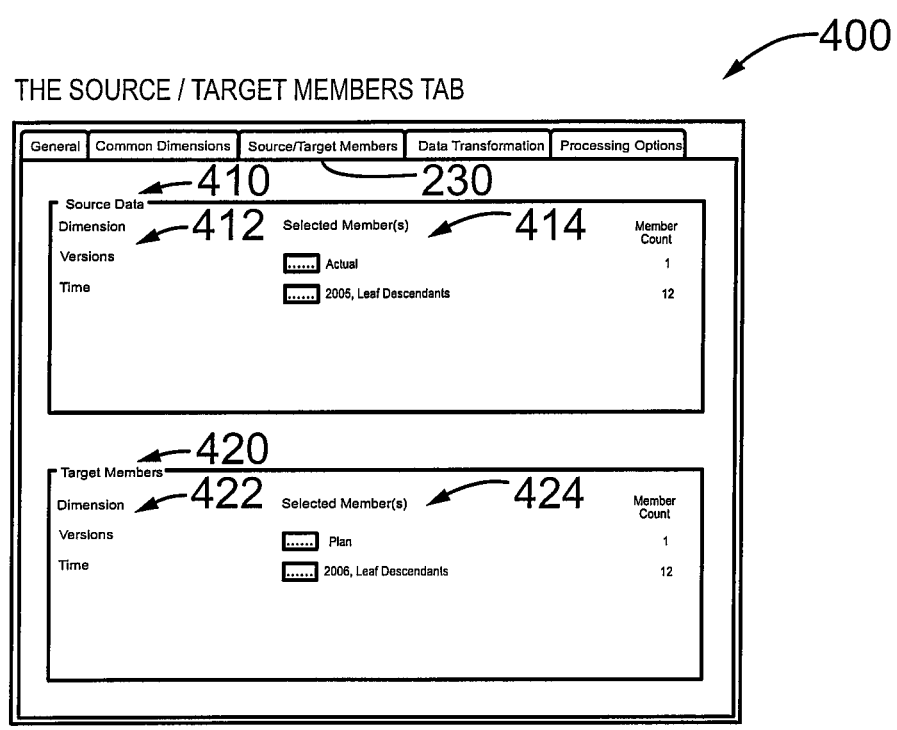
FIG. 4 is an exemplary screen shot of a process configured to select source and/or target members of non-common dimensions for a cube in accordance with an embodiment of the invention.
Figure 5A:
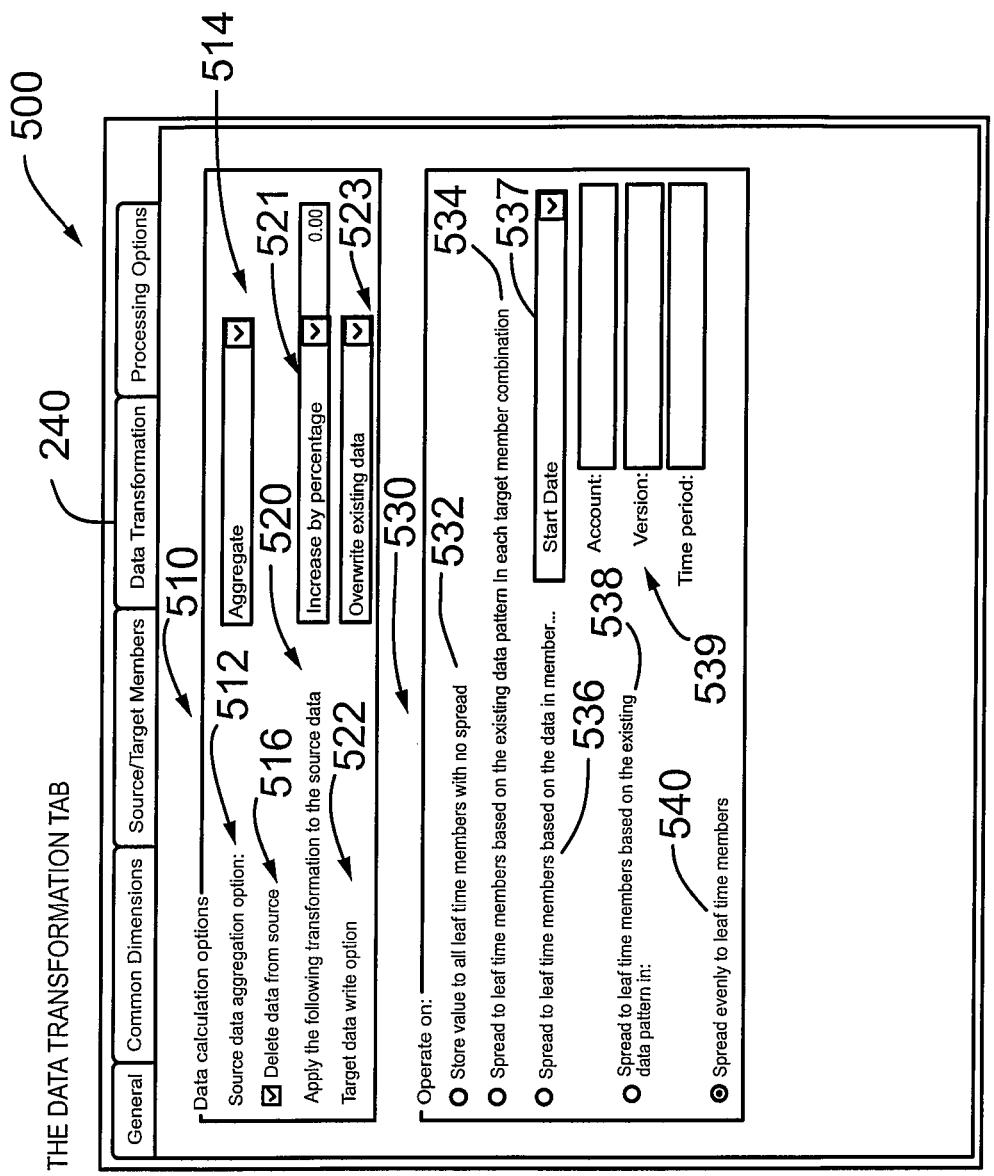
FIG. 5 is an exemplary screen shot of a process configured to specify data transformation operations for a cube in accordance with an embodiment of the invention.
Figure 5B:
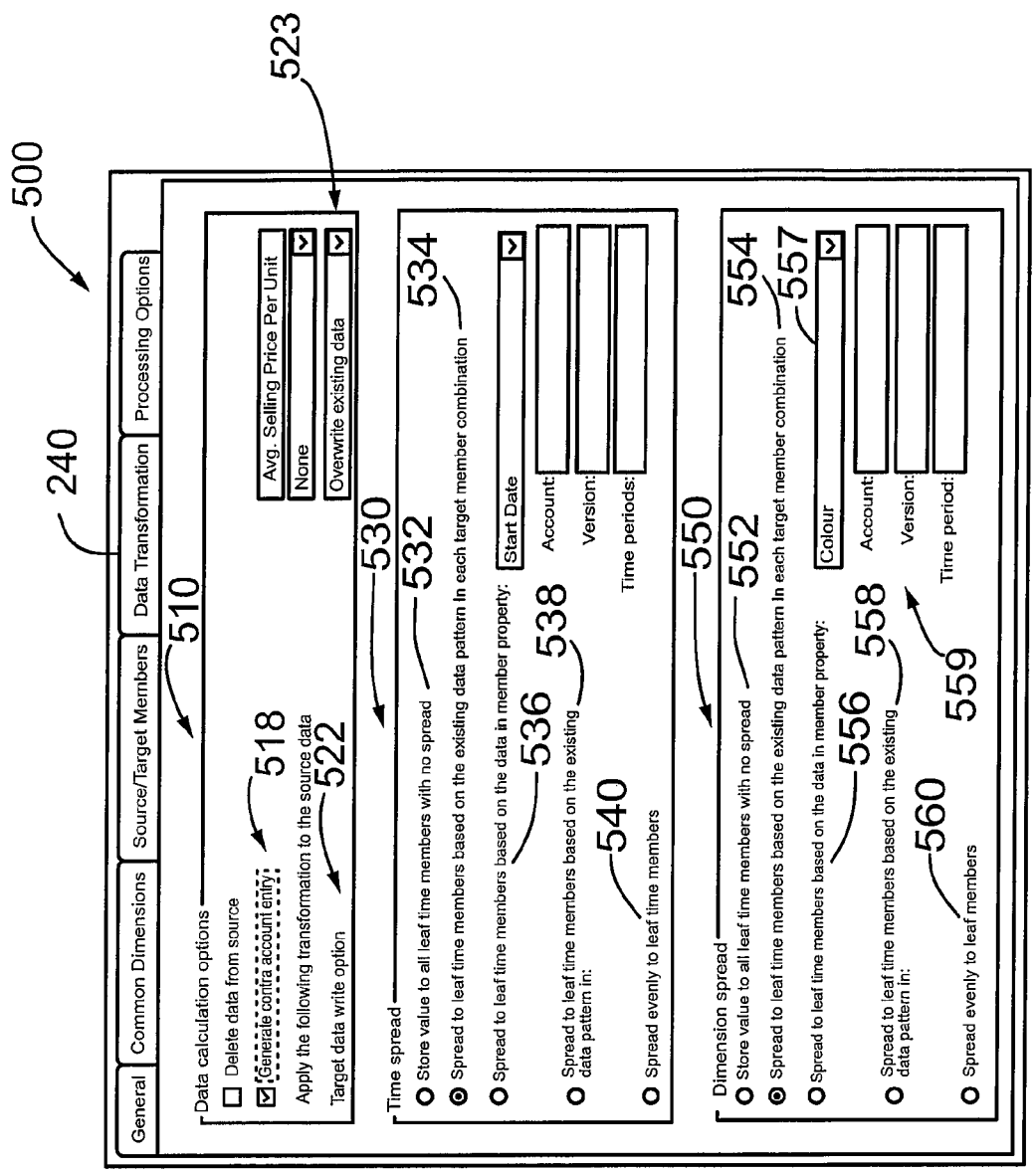
Figure 6:
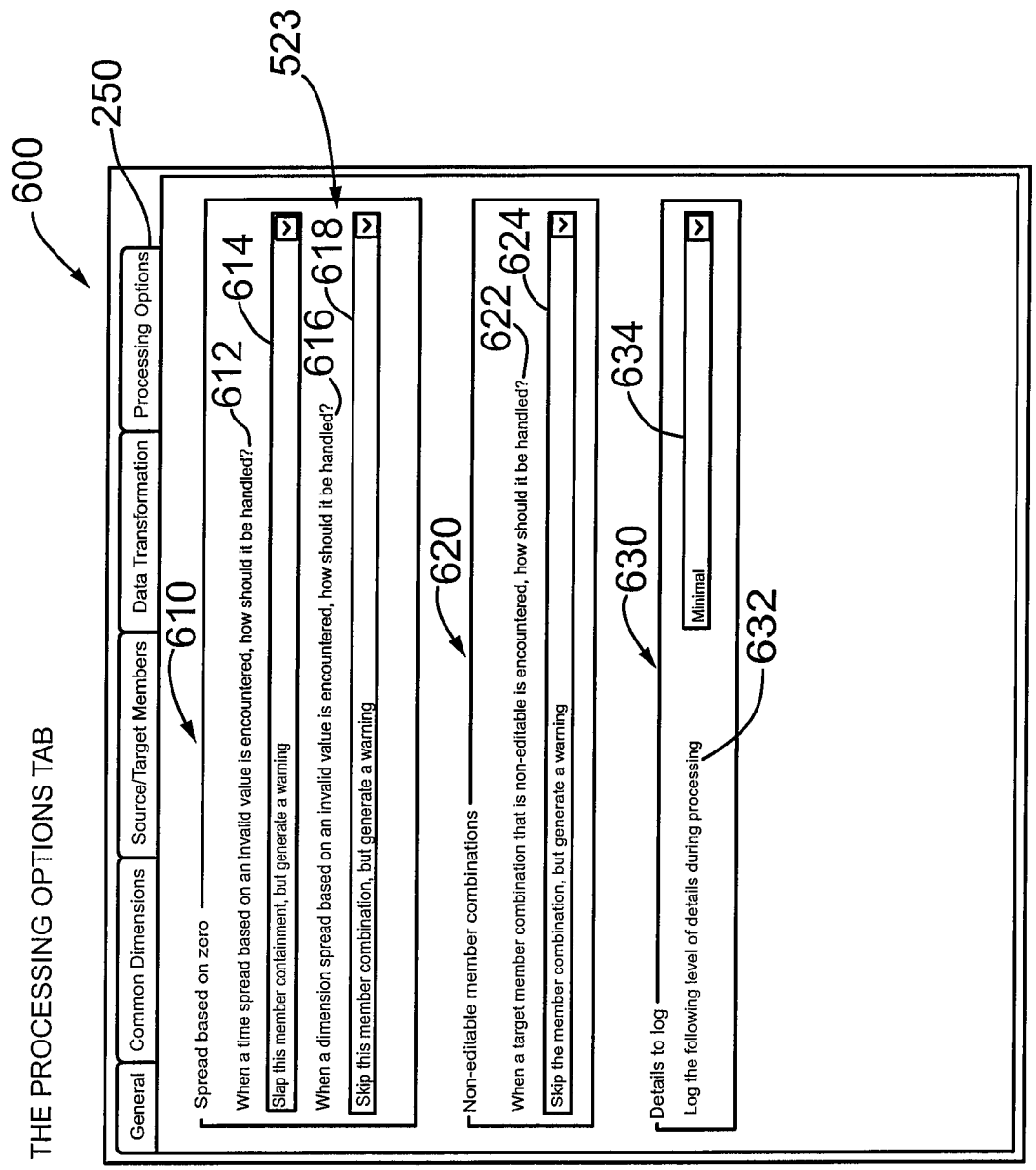
FIG. 6 is an exemplary screen shot of a process configured to specify the handling of processing exceptions.

According to an embodiment, the user interface 112 comprises five screens: a General screen 200 depicted in FIG. 2, a Common Dimensions screen 300 depicted in FIG. 3, a Source/Target Members screen 400 depicted in FIG. 4, a Data Transformation screen 500 as depicted in FIG. 5, and a Processing Options screen 600 as depicted in FIG. 6. As shown each of the screens includes five tabs: a "General" tab 210, a "Common Dimensions" tab 220, a "Source/Target Members" tab 230, a "Data Transformation" tab 240, and a "Processing Options" tab 250. The screens are configured or implemented to provide a user with the capability to specify a process, i.e. a process for processing data in the database. The tabs allow a user to switch or move between screens and the layouts of certain screens will change depending on the options selected in the other tabs, as will be described in more detail below.

The General screen 200 is depicted in FIG. 2 according to an embodiment. The General screen 200 is configured to provide a user with the capability to specify a cube 142 (FIG.

1) in the database 140 (FIG. 1) on which a data process is to be performed or executed. As shown in FIG. 2, the General screen 200 includes an "Operate on" panel 260 for specifying the cube. The main screen 200 also includes an "Options" panel indicated by reference 270. The Options panel 270 is configured to allow a user to "Store or allocate based on existing data" 272, store a user specified value 274, or allocate a specified value 276. The Store or allocate option 272 is configured to read the data to be processed read from the cube. The store option 274 is configured to store a value entered in box 275 by the user at process definition time. The allocate option 276 is configured to allocate a value entered by the user in box 277 by the user during the definition of the data process.

The Common Dimensions screen 300 is depicted in FIG. 3 according to an embodiment. The Common Dimensions screen 300 is configured to provide a user with the capability to select Common Dimensions for a process that will be executed by the calculation engine 126. The Common Dimensions screen 300 is also configured to provide the capability to select "members" of the Common Dimensions for the process. As shown in FIG. 3 and according to an embodiment, cube dimensions indicated by reference 310 are displayed and the user selects a dimension by clicking the associated checkbox. The members associated with a Common Dimension are displayed on the screen 300 as indicated by reference 320. Once a Common Dimension for the cube is selected, the user is able to select one or more of the members for the selected Common Dimension. Members for unchecked Common Dimensions (i.e. non-Common Dimensions) cannot be selected. According to another aspect, at least one member must be selected in a Common Dimension for a data process to be run by the calculation engine. According to another aspect, if the data process comprises the "Store the following value" operation, then the screen 300 is configured to select all of the Common Dimensions and the checkboxes cannot be edited.

The Source/Target Members screen 400 according to an embodiment is shown in FIG. 4. The Source/Target Members screen 400 is configured to provide a user with the capability to select Source members and/or Target members for non-Common dimensions in a cube. According to an embodiment, the Source/Target Members screen 400 comprises a Source Data panel 410 and a Target Members panel 420. The Source Data panel 410 displays non-Common (Source) Dimensions, for example, "Versions" and "Time", as indicated by reference 412. The Target Members panel 420 displays the Members for the selected non-Common Dimension, as indicated by reference 414. According to an aspect, at least one member must be selected in each Source Dimension for a data process to be run by the calculation engine. It will be appreciated that the selected members for the Source Dimensions specify the cells in the cube (i.e. tuples) from which data is read. According to another aspect, if the data process comprises a "Store the following value" operation or an "Allocate the following value" operation, then the Source Data panel 410 is deactivated on the screen 400.

Referring still to FIG. 4, the Target Members panel 420 provides the user with the capability to select Target Dimension members from each non-Common Dimension. The Target Members panel 420 displays non-Common (Target) Dimensions, for example, "Versions" and "Time", as indicated by reference 422. The Target Members panel 420 displays the Member for the selected non-Common Dimension, as indicated by reference 424. If the Target Dimension is "Accounts" or "Versions", then a single member can be selected. For other dimensions, the screen 400 is configured to allow single or multiple target members to be selected by the user. The selected members for the Target Dimensions specify the cells in the cube (i.e. tuples) to which data is written. According to another aspect, if the data process comprises a "Store the following value" operation, then the Target Members panel 420 is deactivated on the screen 400.

The Data Transformation screen 500 according to an embodiment is shown in FIG. 5. The Data Transformation screen 500 is configured to provide a user with the capability to specify how values read from the cube are aggregated, how values from the cube are manipulated, and/or how values are allocated back to the cube. As shown in FIGS. 5(*a*) and 5(*b*), the Data Transformation screen 500 comprises a "Data calculation options" panel 510, a "Time Spread" panel 530, and a "Dimension spread" panel 550.

As shown in FIG. 5(*a*), the Data calculation options panel 510 is configured for a "Source data aggregation option" indicated by 512. This option specifies how data is to be aggregated from multiple Source Dimension member combinations. According to an embodiment, a drop-down list indicated by reference 514 is provided and configured to allow the user to select from "Aggregate", "Average including empty values", "Average excluding empty values" and "Copy between time members" based on the following conditions being true:

time is a non-Common Dimension in the cube the number (#) of Time source members is the same as the number (#) of Time target members the Time source members comprise contiguous leaf members the Time target members comprise contiguous leaf members one Source Dimension member is selected for all non-Common dimensions other than Time one Target Dimension member is selected for all non-Common dimensions other than Time According to a further aspect, the Data Transformation screen 500 is configured to activate/display the Source data aggregation option 512 based on the following conditions being true: the data process comprises the "Storing/Allocating Data Present in the Cube" operation, and there is more than one member selected from at least one Source Dimension.

According to another aspect, the Data calculation options panel 510 includes a "Delete data from source" option as indicated by reference 516 in FIG. 5(*a*). The Delete data from source option 516 allows a user to specify whether source data is to be deleted from the cube. The Data Transformation screen 500 is configured to activate/display the "Delete data from source" option if the operation comprises "Storing/Allocating Data Present in the Cube".

According to another aspect, the Data calculation options panel 510 includes a "Generate contra account entry" option as indicated by reference 518 in FIG. 5(*b*). The Generate contra account entry option 518 allows a user to specify whether data being allocated is to be used in a contra account, and if yes, in which account. The Data Transformation screen 500 is configured to activate/display the "Generate contra account entry" option 518 based on the following conditions being true:

the data process comprises the "Storing/Allocating Data Present in the Cube" operation Accounts comprise a non-Common Dimension at least one dimension, other than Versions and Accounts, comprises a non-Common Dimension only one Source dimension member is selected for the non-Common Dimensions According to another aspect, the Data calculation options panel 510 includes an "Apply the following transformation to the source data" option as indicated by reference 520 in FIG. 5(*a*). The Apply the following transformation to the source data option 520 allows a user to specify how data is to be adjusted before being written to the cube. The options may be configured in a drop-down list 521 and comprise the following options:

"None"
"Increase by Percentage"
"Decrease by Percentage"
"Increase by Absolute Amount"
"Decrease by Absolute Amount"
"Multiply by Amount"

According to another aspect, the Data calculation options panel 510 includes a "Target data write" option as indicated by reference 522 in FIGS. 5(*a*) and 5(*b*). The Target data write option 522 allows a user to specify how data is to be written to a cube. The Target data write options may be configured in a drop-down list 523 and comprise the following options:

"Overwrite Existing Data"
"Add to Existing Data"
"Subtract from Existing Data"

The Time spread panel indicated by reference 530 in FIGS. 5(*a*) and 5(*b*) is configured to allow a user to specify how data is to be allocated across the Time Target dimension. According to an embodiment, the Time spread panel 530 allows data to be allocated according to the following options:

"Store value to leaf members" indicated by 532
"Spread based on existing data" indicated by 534
"Spread based on data in a member property dimension" indicated by 536
"Spread based on data in a different member combination" indicated by 538
"Spread evenly" indicated by 540

According to an embodiment, the Data Transformation screen 500 is configured to display/activate the Time spread panel 530 when the following conditions are true:

the operation is not a "Store the following value" operation
"Time" is non-Common dimension
there is more than one target member selected from the Time dimension
the option selected for "Source Data Aggregation" is not "Copy between time members"

As shown in FIG. 5(*a*), the "Spread based on data in a member property dimension" option 536 includes a drop-down list 537 for specifying additional parameters such as "Start Date". According to another aspect, the Time spread panel 530 is configured to display input boxes 539 for the cube dimensions, i.e. "Account", "Version" and "Time Periods". The cube dimensions are associated with the Spread based on data in a different member combination option 538. The default selected member for each of the cube dimensions is "Same as Target".

The Dimension spread panel indicated by reference 550 in FIG. 5(*b*) is configured to allow a user to specify how data is to be allocated across non-Time Target dimensions. According to an embodiment, the Dimension spread panel 550 allows data to be allocated according to the following options:

"Store value to leaf members with no spread" indicated by 552
"Spread based on existing data" indicated by 554
"Spread based on data in a member property dimension" indicated by 556
"Spread based on data in a different member combination" indicated by 558
"Spread evenly" indicated by 560

According to an embodiment, the Data Transformation screen 500 is configured to display/activate the Dimension spread panel 550 when the following conditions are true:

the operation is not a "Store the following value" operation
there is at least one non-Common Dimension other than the cube dimensions "Time", "Versions" and "Accounts"
there is more than one target member selected from at least one non-Common dimension other Time, Versions and Accounts According to another aspect, the Dimension spread panel 550 is configured to display input boxes 559 for the cube dimensions, i.e. "Account", "Version" and "Time Periods" for the case of the "Spread Based on the existing data pattern" option 558. According to an embodiment, the cube dimensions, except the dimensions associated with selected multiple Target members, are displayed and the user can select a single member from each. The default selected member for each of the cube dimensions is "Same as Target".

The Processing Options screen 600 is accessed by the Processing Options tab 250 and an exemplary implementation according to an embodiment is shown in FIG. 6. The Processing Options screen 600 is configured to provide a user with the capability to specify how the data process is to handle exception conditions. As shown in FIG. 6, the Processing Options screen 600 comprises a "Spread based on zero" panel 610, a "Non-editable member combinations" panel 620, and a "Details to log" panel 630.

As shown in FIG. 6, the "Spread based on zero" panel 610 comprises a "Time Spread Invalid Value Handling" condition indicated by reference 612. According to an embodiment, the Time Spread Invalid Value Handling includes a drop-down list box 614 with the following options:

"Spread evenly with no warning"
"Spread evenly, but generate a warning"
"Skip this member combination with no warning"
"Skip this member combination, but generate a warning" as shown in the list box 614 in FIG. 6
"Abort the process"

Referring again to FIG. 6, the "Spread based on zero" panel 610 also includes a "Dimension Spread Invalid Value Handling" condition indicated by reference 616. According to an embodiment, the Time Spread Invalid Value Handling includes a drop-down list box 618 with the following options:

"Spread evenly with no warning"
"Spread evenly, but generate a warning"
"Skip this member combination with no warning"
"Skip this member combination, but generate a warning" as shown in the list box 618 in FIG. 6
"Abort the process"

As shown in FIG. 6, the "Non-editable member combinations" panel 620 comprises a "When a target member combination that is non-editable is encountered, how should it be handled" option indicated by reference 622. The Non-editable member panel 620 is configured to allow a user to specify what processing occurs if data is to be written to dimension member combinations that are not editable for one or more reasons. According to an embodiment, the Non-editable member panel 620 includes a drop-down list box 624 with the following options:

"Skip the member combination, but generate a warning" as indicated in the list box 624 in FIG. 6
"Skip the member combination with no warning"
"Abort the process"

The "Details to log" panel 630 is configured to provide user selectable reporting options as indicated by reference 632. According to an embodiment, a drop-down list box 634 is provided to list reporting options, for example, including Minimal (as shown), Moderate, Maximum or Full.

Reference will next be made to FIGS. 7 to 19, which further describe the processes, logic and operations associated with the user/client interfaces 112, 124 (FIG. 1) and/or the calculation engine 126, according to embodiments of the present invention.

The data flow in accordance with an embodiment may be generalized as follows:

a data process can be executed for multiple combinations of entities. These entities are based on "common" dimensions. For example, the dimensions "Products" and "Customers" comprise common dimensions, and the process is run for each of 10,000 products and for each of 1,000 customers, for a total of 10,000,000 times.

for each combination of Common Dimensions, the following steps occur:

the data is aggregated or averaged from multiple cells in the cube being calculated (based on "Source" members of each non-Common dimension). For example, the average price across all weeks in a quarter, or the total costs for all departments can be calculated. Alternatively, this value can be specified as a fixed value if the process does not involve reading cube data.

the calculated value can be manipulated further. For example, the average price can be increased by 5%.

the value is then either stored in multiple cells in the cube or allocated (spread) across multiple cells (based on "Target" members of each non-Common dimension). If the data is allocated, an allocation method is specified; the data can be spread evenly, or based on data that already exists in the cube. For example, in order to forecast seasonality, a sales forecast can be spread across months based on the previous year's sales.

The calculation engine 126 is configured to read data from cells (i.e. tuples) in the cube, and the cells are selected based on combinations of the selected Common Dimension members and the selected source members of Source/Target Dimensions, for example, using the logic as described for the user interface screens. The calculation engine 126 is configured to write data to cells (i.e. tuples) based on combinations of the Common Dimension members and target members of Source/Target Dimensions, which are selected, for example, through the user interface screens as described above.

According to an embodiment, the calculation engine 126 is configured to execute three types of operations: (1) "Store or allocate based on existing data"; (2) "Store single data value"; and (3) "Allocate single data value". For the Store or allocate based on existing data operation, the calculation engine 126 includes a process or function configured to read from the cube and aggregate, and optionally, average to derive a single data value. The operations "Store single data value" and "Allocate single data value" represent special cases, when the data that is the source of a Process is not present in the cube. For the Store singe data value operation, the calculation engine 126 includes a process or function configured to populate the cube with identical values, e.g. "Product X prices are $100 for all months in all markets". For the Allocate single data value operation, the calculation engine 126 is configured to allocate a single value across many dimensions, e.g. "Adjust the plan by decreasing planned Total Company Telephone Expenses to $1,000,000 and spread this across departments based on the existing plan".

In the context of the present description, Common Dimensions comprise a "looping" mechanism that allows data to be read from the cube and written to the cube independently for each combination of selected members from the Common Dimensions.

For each of these combinations, the calculation engine 126 is configured as follows:

(1) for reading data from the cube, the calculation engine 126 is configured to read multiple values from the combinations of all selected source members of Source/Target Dimensions; the values can be either aggregated or averaged, the result of which is one data value for each combination of selected Common Dimension members;

(2) read data options—the calculation engine 126 is configured to optionally delete data thus read from all combinations of all selected source members of Source/Target Dimensions;

(3) specified data values—the calculation engine 126 is configured to manipulate data on an individual basis; for example, the calculation engine 126 includes a process for "Storing single data value", and a process "Allocating single data value"); in these cases, the same data value is used for all combinations of selected Common Dimension members;

(4) data transformations—the calculation engine 126 is configured to transform a single data value that is, for example, the result of collecting data from the cube, or that, for example, has been entered as a single value; according to another aspect, the calculation engine 126 is configured to add and/or subtract absolute or percentage amounts to the data value, or multiply the data value (by a factor);

(5) writing data to the cube—the calculation engine 126 is configured to write the data value to the combinations of all selected target members of Source/Target Dimensions. According to a further aspect, the single data value is spread (i.e. allocated) across these combinations or stored in each combination;

(6) allocations—the calculation engine 126 is configured to allocate data to target dimension members; according to another aspect, the calculation engine 126 is configured to allocate or spread data to the combinations of selected target members of Source/Target Dimensions as follows (for example, as described above the with reference to the user interface 112):

"Store value to leaf members" (i.e. copy, don't allocate)

"Spread Based on Existing Data"

"Spread Based on Data in a dimension Member Property"

"Spread Based on data in a different member combination"

"Spread Evenly"

Data allocation for the Time Dimension is treated differently as described in more detail below. Data allocation according to the "Spread Based on data in a different member combination" is treated as an exception to the methods of addressing cells, as described in more detail below.

(7) write data options—the calculation engine 126 is configured to write allocated data to the cube according to the following options:

"Overwrite Existing Data"

"Add to Existing Data

"Subtract from Existing Data

According to another aspect, the calculation engine 126 is configured to optionally adjust data in the selected Source dimension members. It will be appreciated that this function allows adjustments to be made, for example, for financial reporting purposes when overheads are allocated between business entities, as described in more detail with respect to "Contra Accounts".

Figure 7:
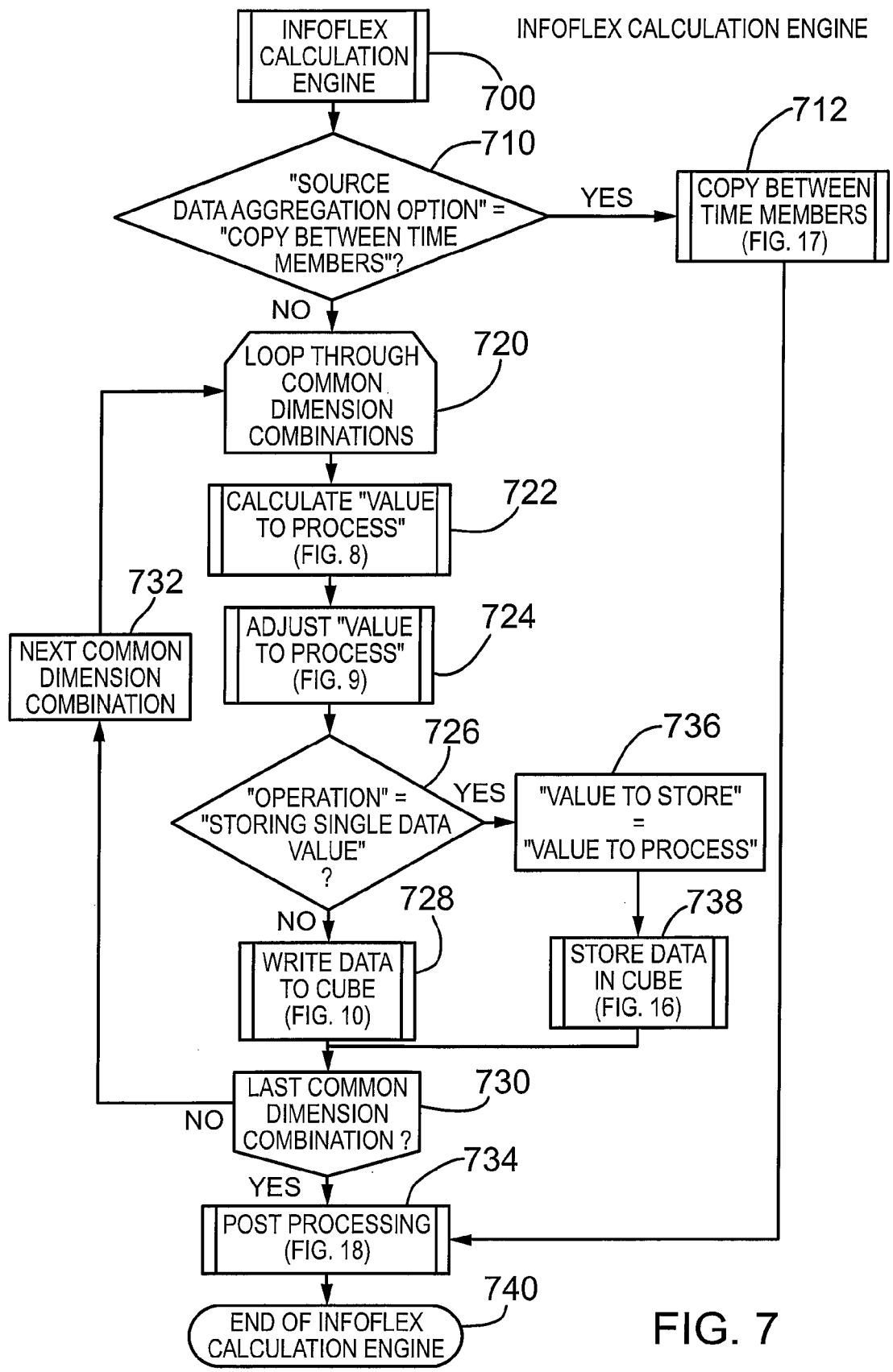
FIG. 7 shows in flowchart form a process for calculating processes in accordance with an embodiment the present invention.

Reference is now made to FIG. 7, which shows an embodiment of a process or processing algorithm for the calculation engine denoted by reference 700. The processing algorithm 700 is implemented to calculate or execute the data processes associated with the cube. According to an embodiment, the process 700 is called or invoked as indicated by reference 701. According to one aspect, the processing algorithm treats all dimensions as equal. According to another aspect, dimensions are separated into two types of dimensions: (1) common dimensions; and (2) source/target dimensions.

As shown in FIG. 7, a decision step 710 is executed to determine the type of "Source data aggregation" operation to be executed. The Source data aggregation operation can be specified by the user according to one or more options, for example, using the Data Transformation Tab operation, as described above with reference to FIG. 5(a). If the Source data aggregation operation comprises a "Copy between time members" operation, then a "Copy between time members" process is executed as indicated by 712. The Copy between time members process executes a process to copy between time members as described in more detail below with reference to FIG. 17. Otherwise, a looping operation through the associated or defined Common Dimension Combinations is executed as indicated by reference 720. For example, if Product is a Common Dimension and there are 10 members of Product selected, then the process will be calculated for each of the selected members. The number of cells affected in an operation (such as reading or writing data) is determined by the number of members selected in each cube dimension. The number of cells affected is the product of the numbers of members selected in all cube dimensions. As shown in FIG. 7, a check is made in 730 to determine if all the Common Dimension Combinations have been considered. If not, the loop process is repeated for the next Common Dimension Combination as indicated by 732.

As shown in FIG. 7, a process is executed in 722 to calculate "Value to Process" for the common dimension combination. The Value to Process comprises a process that is configured to read cube data and aggregate the data or calculate an average value. An embodiment of a process to calculate "Value to Process" is described in more detail below with reference to FIG. 8. Next, a process to adjust "Value to Process" is executed as indicted by reference 724. The Adjust Value to Process comprises a process configured to calculate adjustments to data read from the cube. An embodiment of a process for adjusting "Value to Process" is described in more detail below with reference to FIG. 9. Next as indicated by reference 726, a check is made to determine if the operation involves storing a single data value. If yes, the single data value is assigned to "Value to Store" as indicated by reference 736, and process configured to Store Data in the Cube is called or invoked as indicated by reference 738. An embodiment of a process to store data in the cube is described in more detail below with reference to FIG. 16. If the operation does not involve a single data value (i.e. as determined in 726), then a process configured to "Write Data to Cube" is called or invoked as indicated by reference 728. The write data to cube process manages the allocation of data across the Time Dimension. An embodiment of write data to cube process is described in more detail below with reference to FIG. 10. If the last common dimension combination has been considered (i.e. as determined in 730), then post processing may be initiated or invoked as indicated by reference 734. According to an embodiment, the post processing comprises execution of a process configured to manage deletion of source data and/or generation of contra account entries, as described in more detail below with reference to FIG. 18. The calculation engine 126, and its associated processes, terminate as indicated by reference 740.

Figure 8:
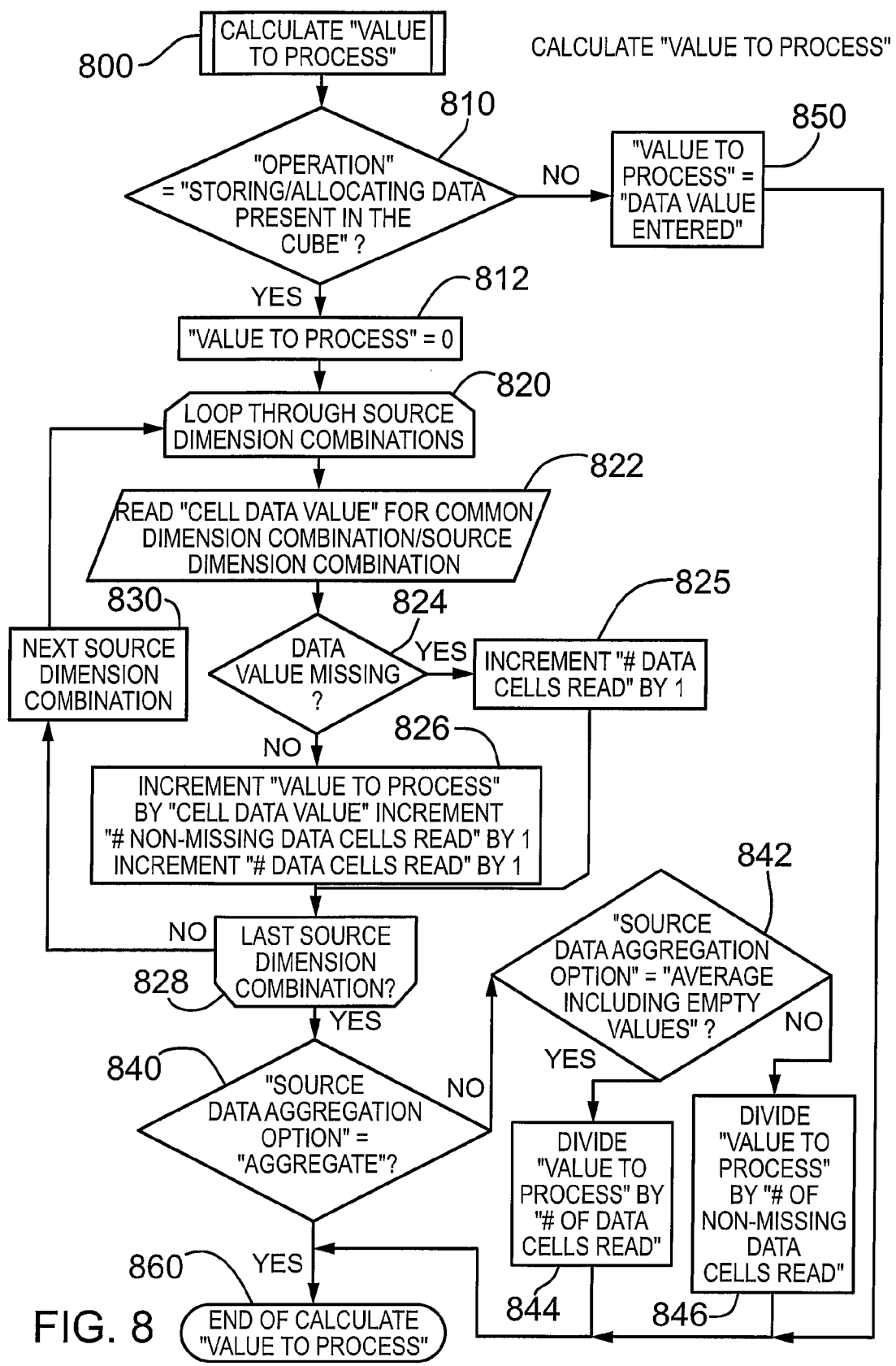
FIG. 8 shows in flowchart form a process for reading data from a cube and determining an average value in accordance with an embodiment the present invention.

Reference is next made to FIG. 8, which shows in flowchart form an embodiment of a process to calculate the "Value to Process". The process is indicated generally by reference 800 and was called or invoked as indicated by reference 722 (FIG. 7). The process for calculating value to process comprises first determining if the specified data process comprises a "storing/allocating data present in the cube" operation as indicated by reference 810. If no, then the "Value to Process" is set to the entered data value, and the process 800 is terminated or ended as indicated by reference 860. If the process comprises a "storing/allocating data present in the cube" operation (decision block 810), then the "Value to Process" parameter is set to zero as indicated by reference 812. Next a looping operation through the associated or defined Source Dimension Combinations is executed as indicated by reference 820. For example, if a Source Dimension has 12 members and 10 members are selected, then the process will be calculated for each of the selected members. The number of cells affected in an operation (such as reading or writing data) is determined by the number of members selected in each cube dimension. The number of cells affected is the product of the numbers of members selected in all cube dimensions. As shown in FIG. 8, a check is made in 828 to determine if all the Source Dimension Combinations have been considered.

As shown in FIG. 8, the first step in the looping operation involves reading a "Cell Data Value" for the Common Dimension Combination/Source Dimension Combination, as indicated by reference 822. Next in decision block 824 a check is made for a missing data value. If a data value is missing, then the next step involves incrementing the parameter "# Data Cells Read" by one (1), as indicated by reference 825. If a data value is not missing (decision block 824), then the next step comprises incrementing the parameter "Value to Process" by the "Cell Data Value" and incrementing by one (1) the parameter "# Non-Missing Data Cells Read" and the parameter "# Data Cells Read", as indicated by reference 826. If this is the "Last Source Dimension Combination" (as determined in step 828), then a check is made in decision block 840 to determine if the "Source Data Aggregation Option" is the "Aggregate", if yes then the process 800 is terminated or ended as indicated by reference 860. If no, then a check is made in decision block 842 to determine if the "Source Data Aggregation Option" is equal to the calculated "Average including empty values". If no, then the "Value to Process" is divided by the number of Non-Missing Data Cells Read" in step 846, and then the process 800 is terminated in step 860. If the "Source Data Aggregation Option" is equal to the calculated "Average including empty values" (as determined in decision block 842), the "Value to Process" is divided by the number of "Data Cells Read" in step 844, and then the process 800 is terminated in step 860.

Figure 9:
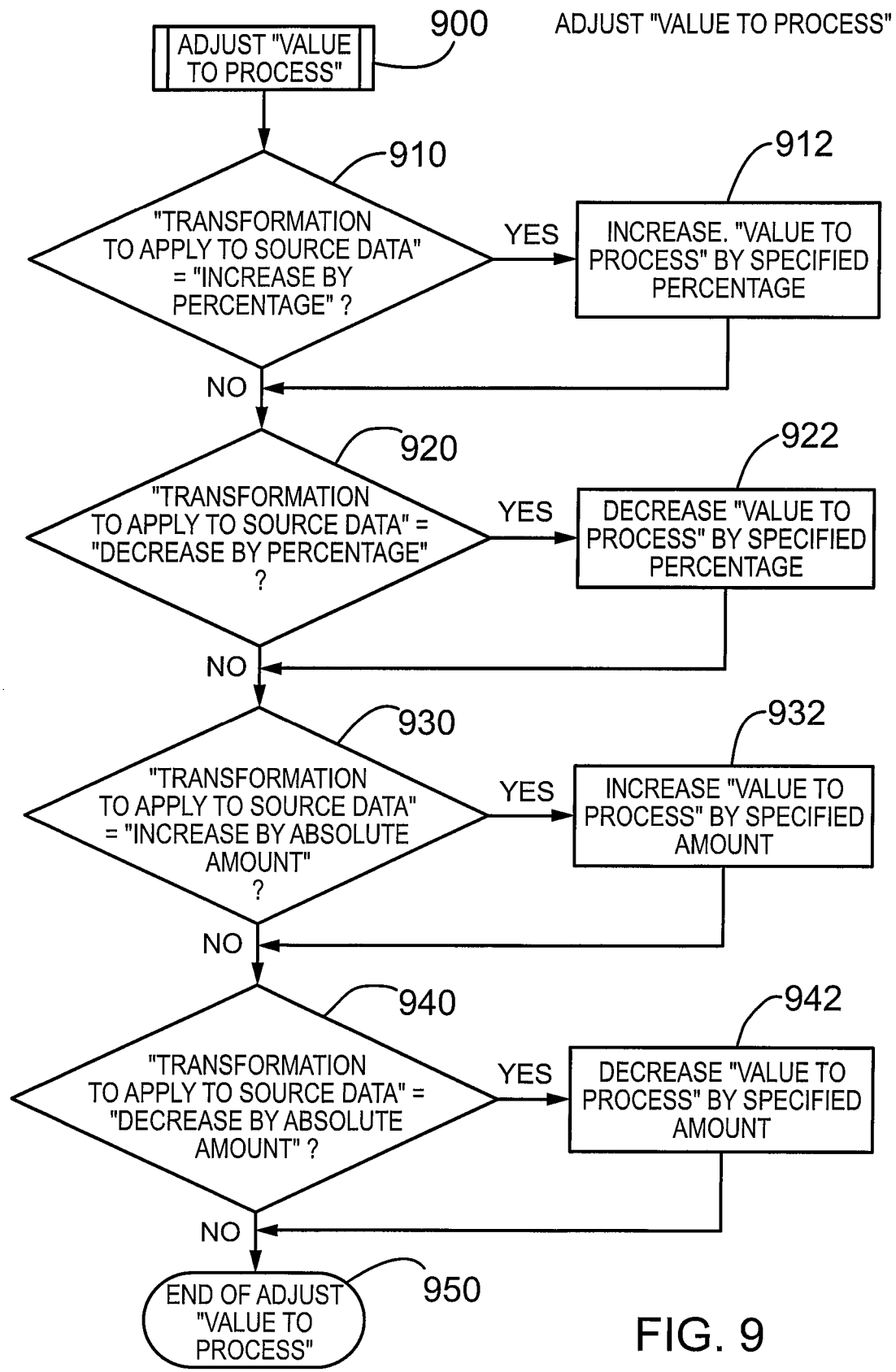
FIG. 9 shows in flowchart form a process for determining adjustments to data read from a cube in accordance with an embodiment of the present invention.

Reference is next made to FIG. 9, which shows in flowchart form an embodiment of a process, i.e. a software process or processor configured to adjust the "value to process". The process is indicated generally by reference 900 and is called or invoked as indicated by reference 724 (FIG. 7). The process for adjusting the "value to process" 900 comprises applying one or more transformations to "Source Data". A check is made in step 910 to determine if the first transformation comprises increasing the source data by a percentage. If no, then the next transformation is determined in step 920. If yes, then the "Value to Process", i.e. the source data, is increased by a specified percentage, as indicated by reference 912. Next a check is made in step 920 to determine if the transformation comprises decreasing the source data by a percentage. If no, then the next transformation is determined in step 930. If yes, then the "Value to Process", i.e. the source data, is decreased by a specified percentage, as indicated by reference 922. Next a check is made in step 930 to determine if the transformation comprises increasing the source data by an absolute amount. If no, then the next transformation is determined in step 940. If yes, then the "Value to Process", i.e. the source data, is increased by a specified amount, as indicated by reference 932. Next a check is made in step 940 to determine if the transformation comprises decreasing the source data by an absolute amount. If no, then the adjust source data value process 900 ends or terminates as indicated in step 950. If yes, then the "Value to Process", i.e. the source data, is decreased by a specified amount, as indicated by reference 942, and the process 900 terminates in step 950.

Figure 10:
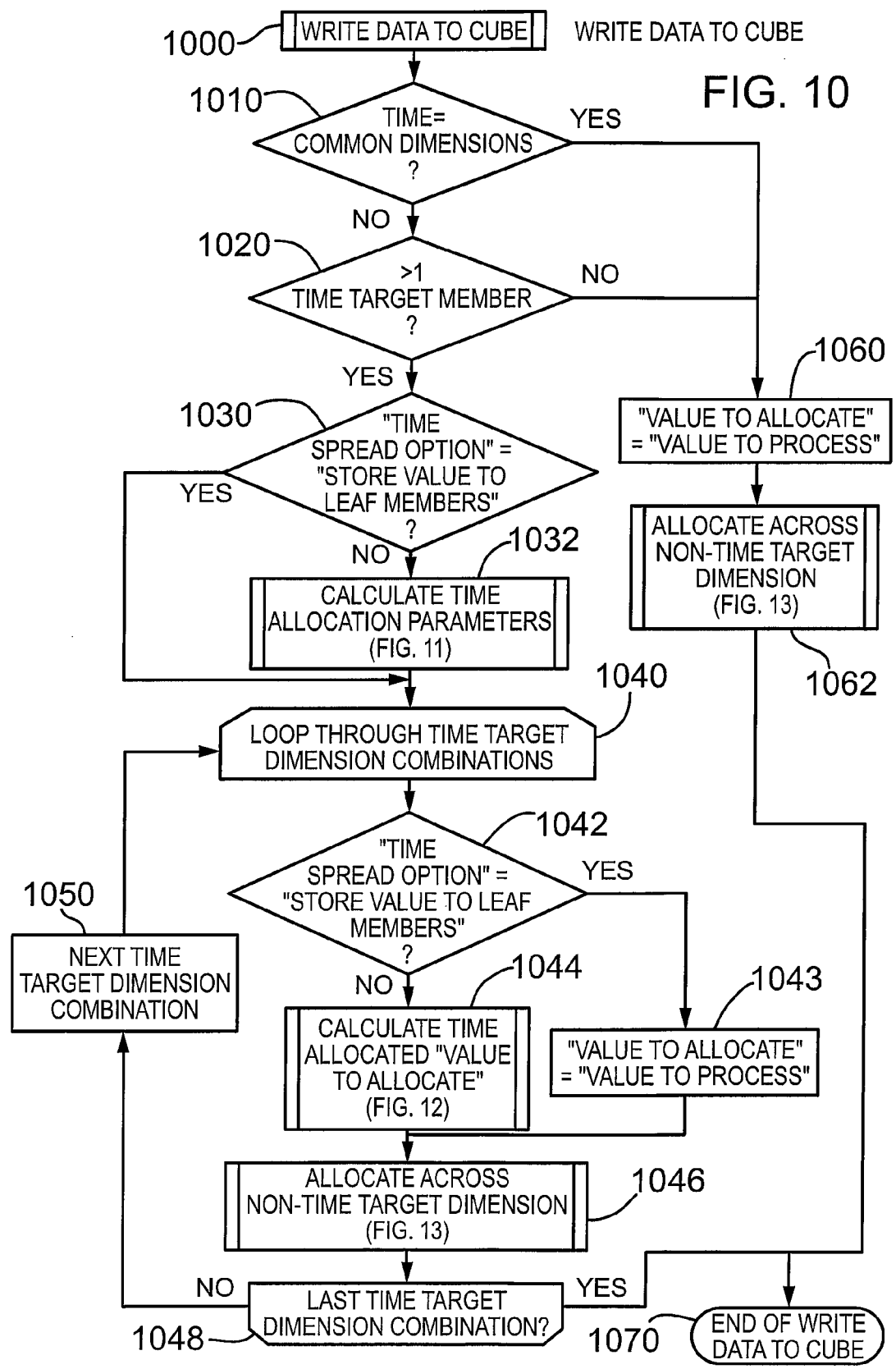
FIG. 10 shows in flowchart form a process for managing the allocation of data to a cube based on a time dimension in accordance with an embodiment of the present invention.

Reference is next made to FIG. 10, which shows in flowchart form an embodiment of a process, i.e. a software process or processor configured to write or allocate data to a cube. The process is indicated generally by reference 1000 and is called or invoked as indicated by reference 728 (FIG. 7). According to an embodiment, the process according to the present invention treats time as a special dimension for the purposes of allocating, i.e. writing, data to the cube. If time is a Target Dimension with multiple Target Dimensions being selected, then according to an embodiment, data is allocated across the time dimension before being allocated across other dimensions. According to this aspect, the time dimension has a different allocation method or process than the other target dimensions.

As shown in FIG. 10, the process 1000 comprises a number of operations or steps for writing data to a cube. As shown, the first step comprises determining if the time parameter is a "Common Dimension", as indicated by decision block 1010. If yes, then the data to write to the cube, i.e. "Value to Allocate", is based on the "Value to Process", as indicated by reference 1060, and because "Time" is a "Common Dimension", the "Value to Process" is allocated across the non-Time target dimension for the cube in step 1062, and the write data to cube process 1000 ends as indicated by step 1070. A process for allocating across non-time target dimensions according to an embodiment is described in more detail below with reference to FIG. 13.

If Time is not a Common Dimension (as determined in decision block 1010), then a check is made to determine if the number of Time Target Members is greater than one, as indicated by decision block 1020. If no, then the data to write to the cube, i.e. "Value to Allocate", is based on the "Value to Process", as indicated by reference 1060, and because "Time" is a "Common Dimension", the "Value to Process" is allocated across the non-Time target dimension for the cube in step 1062. The process for writing data to cube 1000 ends as indicated by step 1070. If yes (as determined in decision block 1020), then next a determination is made in decision block 1030 to determine if the "Time Spread Option" is set to "Store value to leaf members". If no, then a process to calculate time allocation parameters is called as indicated by step 1032, and described in more detail below with reference to FIG. 11. If the Time Spread Option is set to Store value to leaf members (decision block 1030), then the process loops through the Time Target Dimension Combinations as indicated generally by reference 1040. As indicated by decision block 1042, a check is made to determine if the Time Spread Option is set to Store value to leaf members. If yes, then the Value to Allocate (i.e. the data to write to the cube) is set to the "Value to Process" as indicated by reference 1043, and a process to allocate across non-time target dimensions is called in step 1046. An embodiment of a process to allocate across non-time target dimensions is described in more detail below with reference to FIG. 13.

As shown in FIG. 10, if the time spread option is not set to store value to leaf members (as determined in decision block 1042), then a process to calculate Time Allocated "Value to Allocate" is called in step 1044. An embodiment of a process to calculate Time Allocated "Value to Allocate" is described in more detail below with reference to FIG. 12. Next, the process to allocate across non-time target dimensions is called in step 1046. And then in step 1048, a check is made to determine if the last Time Target Dimension Combination has been considered. If no, then the next Time Target Dimension Combination is determined in step 1050 and the looping operation (as indicated in block 1040) is repeated. Otherwise, the process for writing data to the cube 1000 ends as indicated by reference 1070.

Figure 11A:
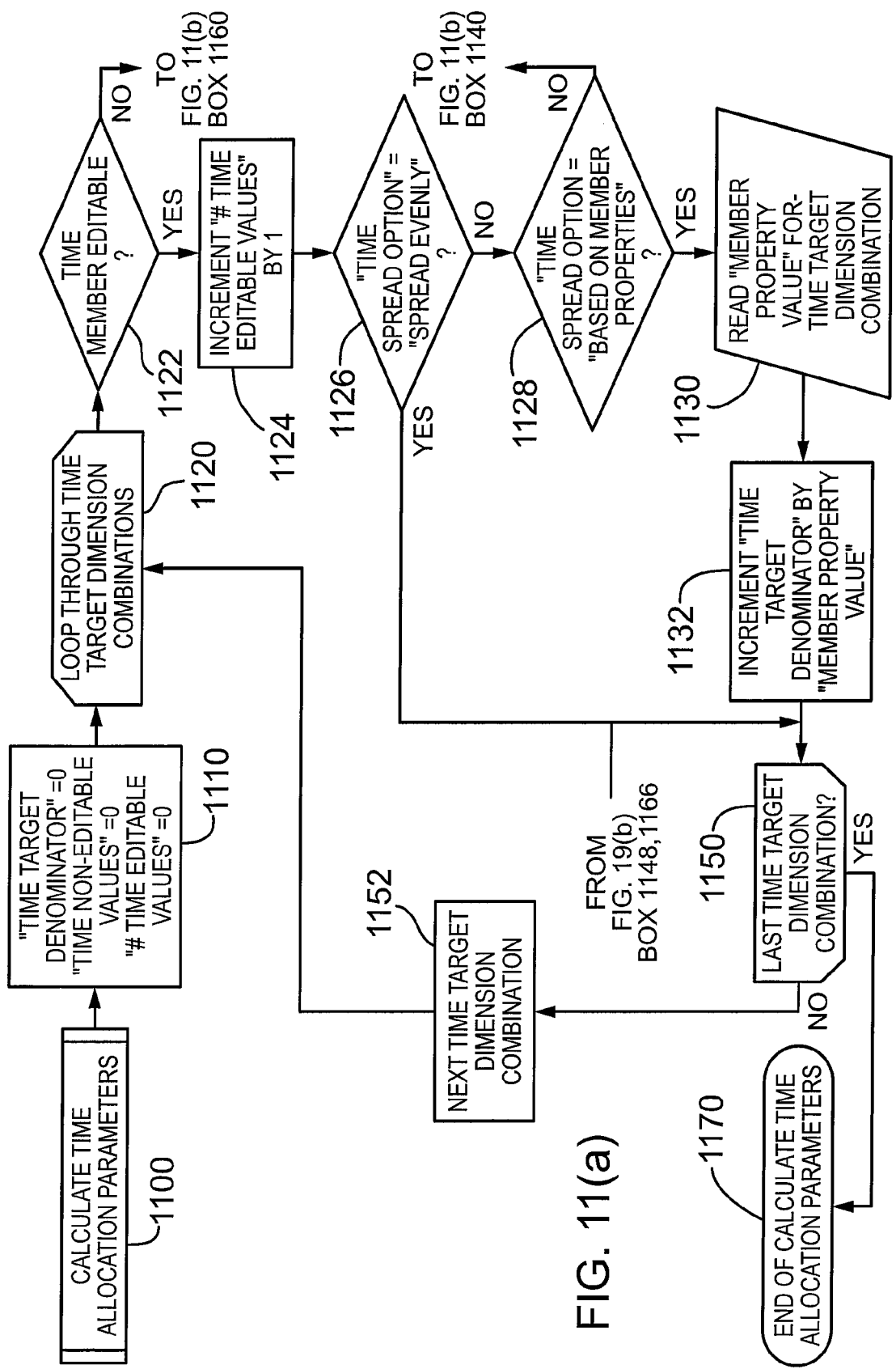
FIG. 11 shows in flowchart form a process for determining time allocation parameters in accordance with an embodiment of the present invention.
Figure 11B:
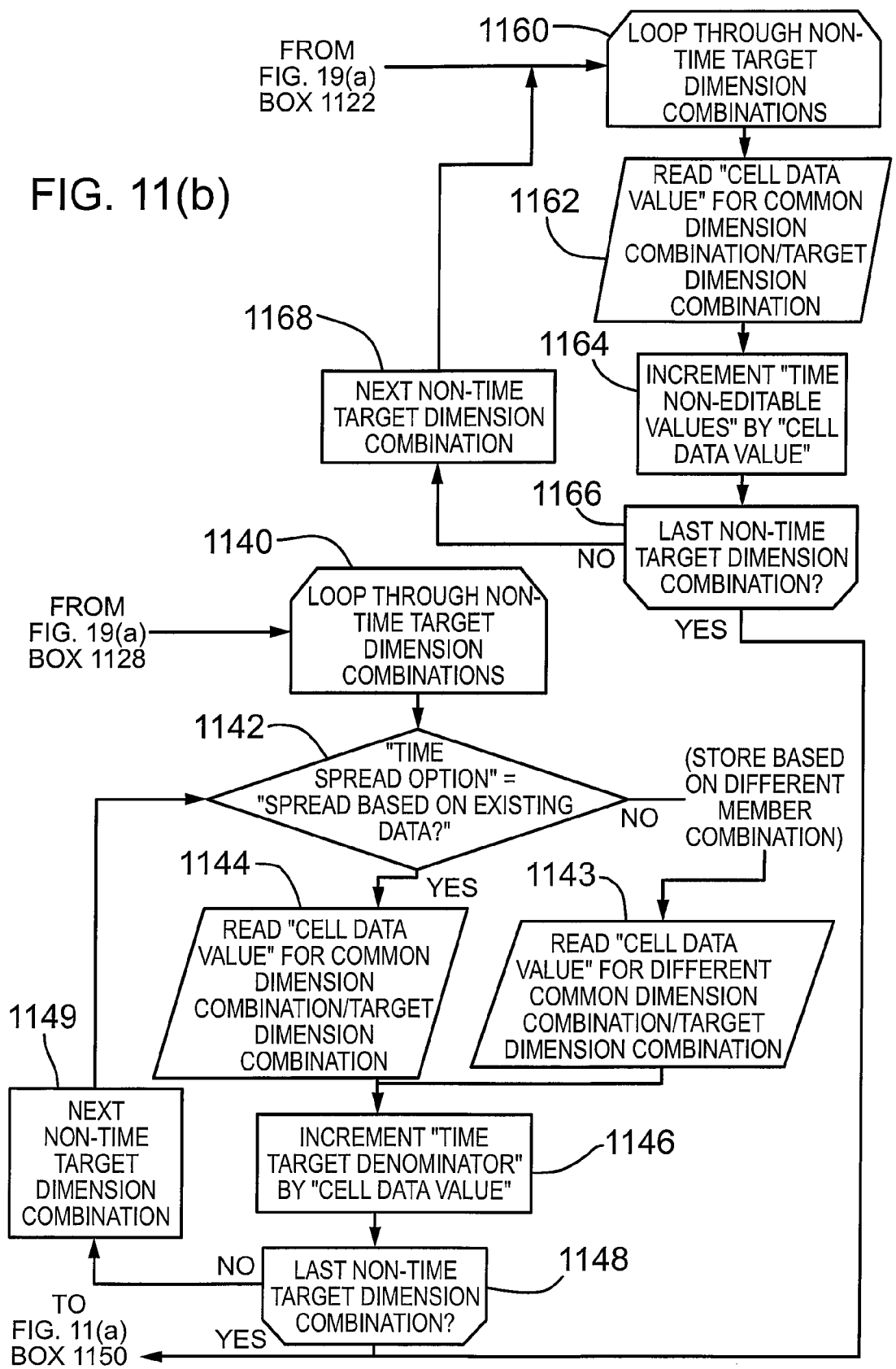

Reference is next made to FIG. 11, which shows in flowchart form an embodiment of a process, i.e. a software process or processor configured to calculate time allocation parameters. The process is indicated generally by reference 1100 and is called or invoked as indicated by reference 1032 (FIG. 10). The process for calculating the time allocation parameters 1100 comprises initializing the following parameters: "Time Target Denominator"=0, "Time Non-Editable Values"=0, and "# Time Editable Values"=0, as indicated by reference 1110. Next, the process 1100 comprises looping through the Time Target Dimension Combination(s) as indicated generally by reference 1120. As indicated by decision block 1122, a check is made to determine if the Time Member parameter is editable. If no, then the process 1100 loops through Non-Time Target Dimension Combination(s) as indicated by reference 1160, as will be described in more detail below. If yes (as determined in decision block 1122), then the next step comprises incrementing the parameter "# Time Editable Values", as indicated by reference 1124. Next, a determination is made in step 1126 to determine if the "Time Spread Option" is set to "Spread Evenly". If yes, then a check is made to determine if the all the Time Target Dimension Combinations have been considered, as indicated by reference 1150. If no, then a check is made to determine if the "Time Spread Option" is set to the option "Based on Member Properties", as indicated by decision block 1128. If no, then the process loops through Non-Time Target Dimension Combinations as indicated by reference 1140 and described in more detail below. If yes, then the process 1100 reads or inputs the "Member Property Value" associated with the Time Target Dimension Combination, as indicated by reference 1130. Next, the process 1100 increments the parameter "Time Target Denominator" by the value for the "Member Property Value", as indicated by reference 1132. If there are still Time Target Dimension Combinations to loop through as determined in step 1150, then the next Time Target Dimension Combination is selected, as indicated by reference 1152, and the looping process (step 1120) is repeated. Otherwise, the process for calculating time allocation parameters 1100 terminates or ends, as indicated by reference 1170, and control returns to the calling process or function.

Referring again to FIG. 11, if the Time Member cannot be edited (as determined in decision block 1122), then the process 1100 executes the looping operation through the Non-Time Target Dimension Combinations as indicated by reference 1160. As indicated by reference 1162, the looping operation comprises reading or inputting the "Cell Data Value" for the Common Dimension Combination/Target Dimension Combination. Next, as indicated by reference 1164, the "Time Non-Editable Values" is incremented by the Cell Data Value (read in step 1162). Next in step 1166, a check is made to determine if the last Non-Time Target Dimension Combination has been considered. If no, then the next Non-Time Target Dimension Combination is determined in step 1168 and the looping operation (as indicated in block 1160) is repeated. Otherwise, the process the moves to step 1150 as described above.

Referring to FIG. 11, if the "Time Spread Option" is not set to "Based on Member Properties" (as determined in decision block 1128), then the process 1100 executes the looping operation through the Non-Time Target Dimension Combinations as indicated by reference 1140. As indicated by decision block 1142, a check is made to determine if the parameter "Time Spread Option" is set to "Spread Based on Existing Data". If no, then the process 1100 stores data based on a different member combination. As indicated by reference 1143, the process 1100 is configured to read or input a "Cell Data Value" for a different Common Dimension Combination/Target Dimension Combination. Next and as indicated by reference 1146, the process 1100 increments the Time Target Denominator by the Cell Data Value (in this case the Cell Data Value read in step 1143). Next in step 1148, a check is made to determine if the last Non-Time Target Dimension Combination has been considered. If no, then the next Non-Time Target Dimension Combination is determined in step 1149 and the operation (as indicated in block 1142) is repeated. Otherwise, the process moves to step 1150 as described above.

Referring again to FIG. 11, if the "Time Spread Option" is set to "Spread Based on Existing Data" (as determined in decision block 1142), then the process 1100 is configured to read or input a "Cell Data Value" for the Common Dimension Combination/Target Dimension Combination, as indicated by reference 1144. Next, the process 1100 increments the Time Target Denominator by the Cell Data Value (in this case the Cell Data Value read in step 1144), as indicated by reference 1146. Next in step 1148, a check is made to determine if the last Non-Time Target Dimension Combination has been considered. If no, then the next Non-Time Target Dimension Combination is determined in step 1149 and the operation in step 1142 is repeated as described above. Otherwise, the process moves to step 1150 as described above.

Figure 12:
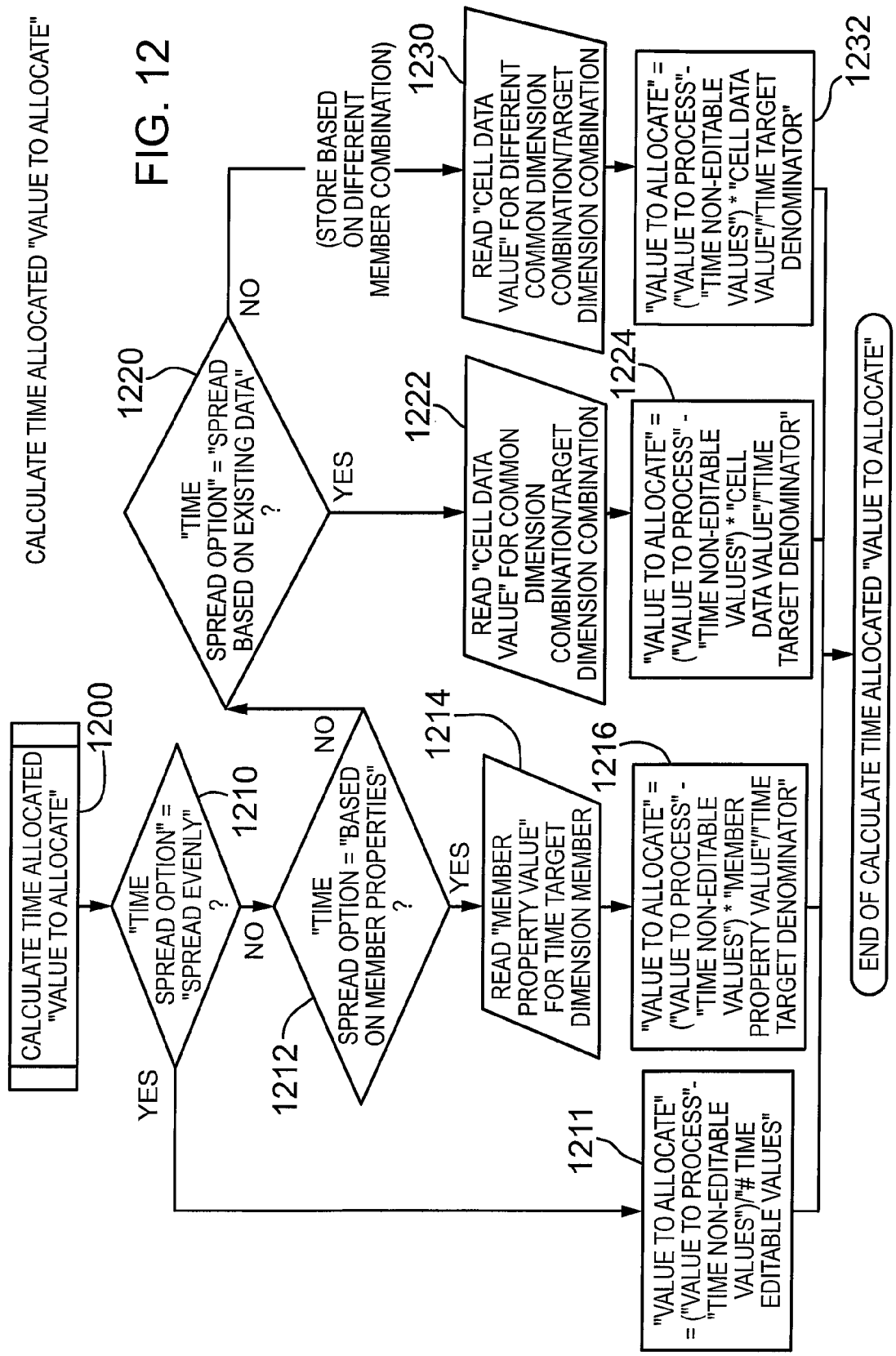
FIG. 12 shows in flowchart form a process for calculating data allocations across a time dimension in accordance with an embodiment of the present invention.

Reference is next made to FIG. 12, which shows in flowchart form an embodiment of a process, i.e. a software process or processor configured to calculate the time allocation for value to allocate. The process is indicated generally by reference 1200 and is called or invoked as indicated by reference 1044 (FIG. 10). The process for calculating the time allocation for value to allocate 1200 comprises first determining if the Time Spread Option is set to "Spread Evenly" in decision block 1210. If yes, then according to an embodiment, the "Value to Allocate" is calculated as follows, Value to Allocate=(Value to Process−Time Non-Editable Values)/# Time Editable Values Next, the process for calculating time allocated for value to allocate 1200 terminates or ends as indicated by reference 1240, and control returns to the calling process or function.

If no (as determined in decision block 1210), then a check is made in decision block 1212 to determine if the Time Spread Option is set to "Based on Member Properties". If yes, then the next operation in the process 1200 comprises reading or inputting the "Member Property Value" for the Time Target Dimension Member, as indicated by reference 1214. Next and according to an embodiment, the Value to Allocate is calculated in step 1216 as follows:

ValueToAllocate=(ValueToProcess−TimeNon-EditableValues)*MemberPropertyValue/TimeTargetDenominator Next, the process for calculating time allocated for value to allocate 1200 terminates or ends as indicated by reference 1240.

If the Time Spread Option is not set to the Based on Member Properties (as determined in decision block 1212), then a check is made in decision block 1220 to determine if the Time Spread Option is to the "Spread Based on Existing Data" option. If yes, then the next operation in the process 1200 comprises reading or inputting the "Cell Data Value" for the Common Dimension/Target Dimension Combination, as indicated by reference 1222. Next and according to an embodiment, the Value to Allocate is calculated in step 1224 as follows:

ValueToAllocate=(ValueToProcess−TimeNon-EditableValues)*CellDataValue/TimeTargetDenominator The process for calculating time allocated for value to allocate 1200 then terminates or ends as indicated by reference 1240.

Referring again to FIG. 12, if the Time Spread Option is not set to Spread Based on Existing Data (as determined in decision block 1220), then the process 1200 operates to store (allocate) based on a different member combination. As indicated by reference 1230, the next operation in the process 1200 comprises reading or inputting the "Cell Data Value" for the Different Common Dimension/target Dimension Combination. Next and according to an embodiment, the Value to Allocate is calculated in step 1232 as follows:

ValueToAllocate=(ValueToProcess−TimeNon-EditableValues)*CellDataValue/TimeTargetDenominator Next, the process for calculating time allocated for value to allocate 1200 terminates or ends as indicated by reference 1240.

Figure 13:
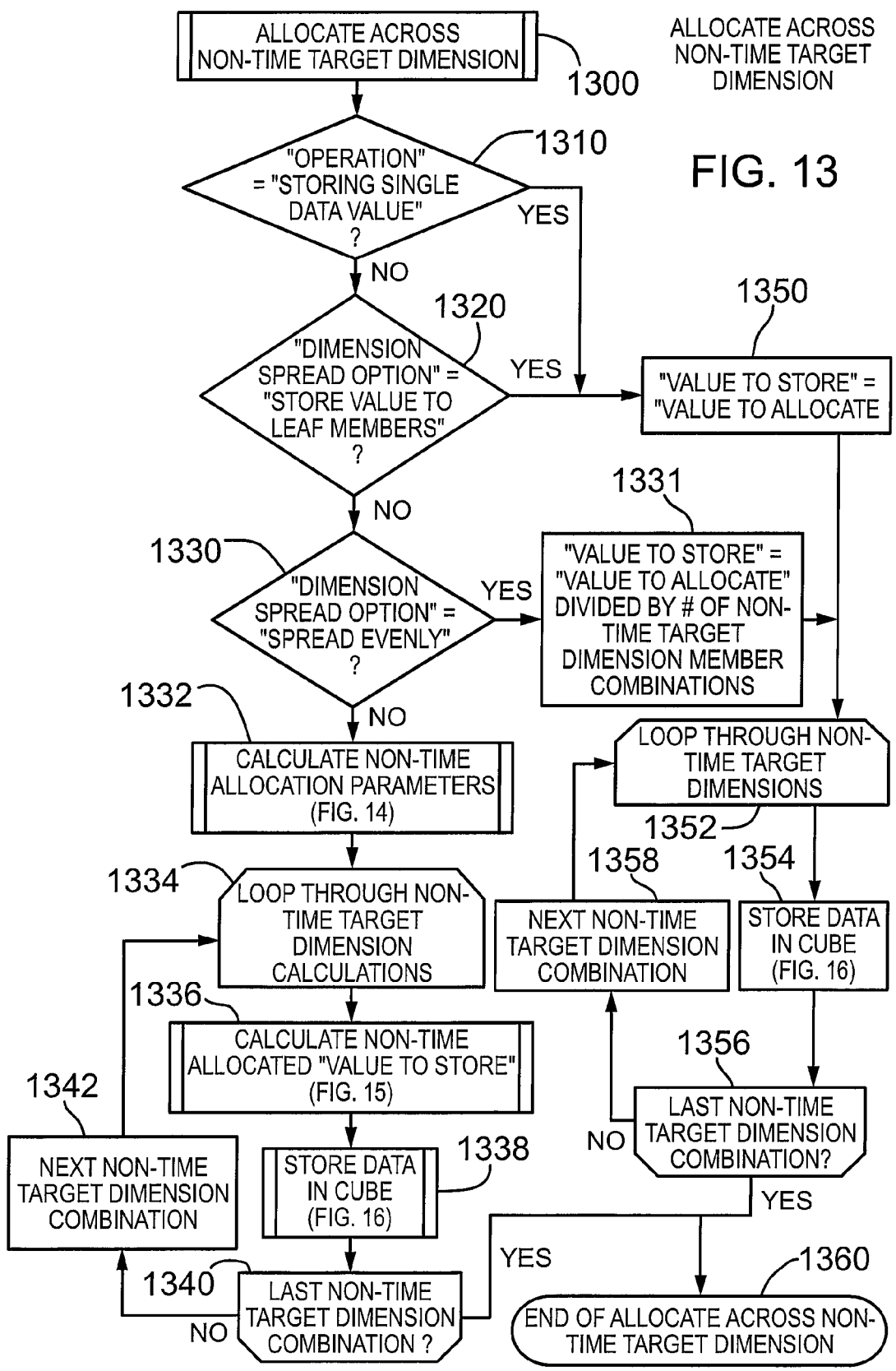
FIG. 13 shows in flowchart form a process for managing data allocations across non-time dimensions in accordance with an embodiment of the present invention.

Reference is next made to FIG. 13, which shows in flowchart form an embodiment of a process, i.e. a software process or processor configured to allocate data across non-time target dimensions. The process is indicated generally by reference 1300 and is called or invoked as indicated by reference 1046 or 1062 (FIG. 10). The process for allocating data across non-time target dimensions 1300 comprises determining if the operation comprises "Storing a single data value" as indicated by decision block 1310. If the operation comprises storing a single data value (as determined in decision block 1310), then the next operation in the process 1300 comprises setting "Value to Store" to "Value to Allocate" as indicated by reference 1350. If the operation is not set to "Storing single value data" (i.e. as determined in decision block 1310), then the process 1300 checks if the "Dimension Spread Option" is set to "Store value to leaf members" as indicated by decision block 1320. If yes, then the process performs the operation in step 1350 as described above. Next the process 1300 loops through the Non-Time Target Dimension Combination(s) as indicated by reference 1352. The looping operation includes storing data in the cube as indicated by reference 1354. A process or function configured to store data in a cube according to an embodiment is described in more detail below with reference to FIG. 16. A check is made in step 1356 to determine if there are any other Non-time Target Dimension Combinations to consider, then the next Non-time Target Dimension Combination is selected, as indicated by reference 1358, and the looping process (reference 1352) is repeated. Otherwise, the process for allocating data to a cube across non-time target dimensions 1300 terminates or ends, as indicated by reference 1360, and control returns to the calling process or function.

Figure 16:
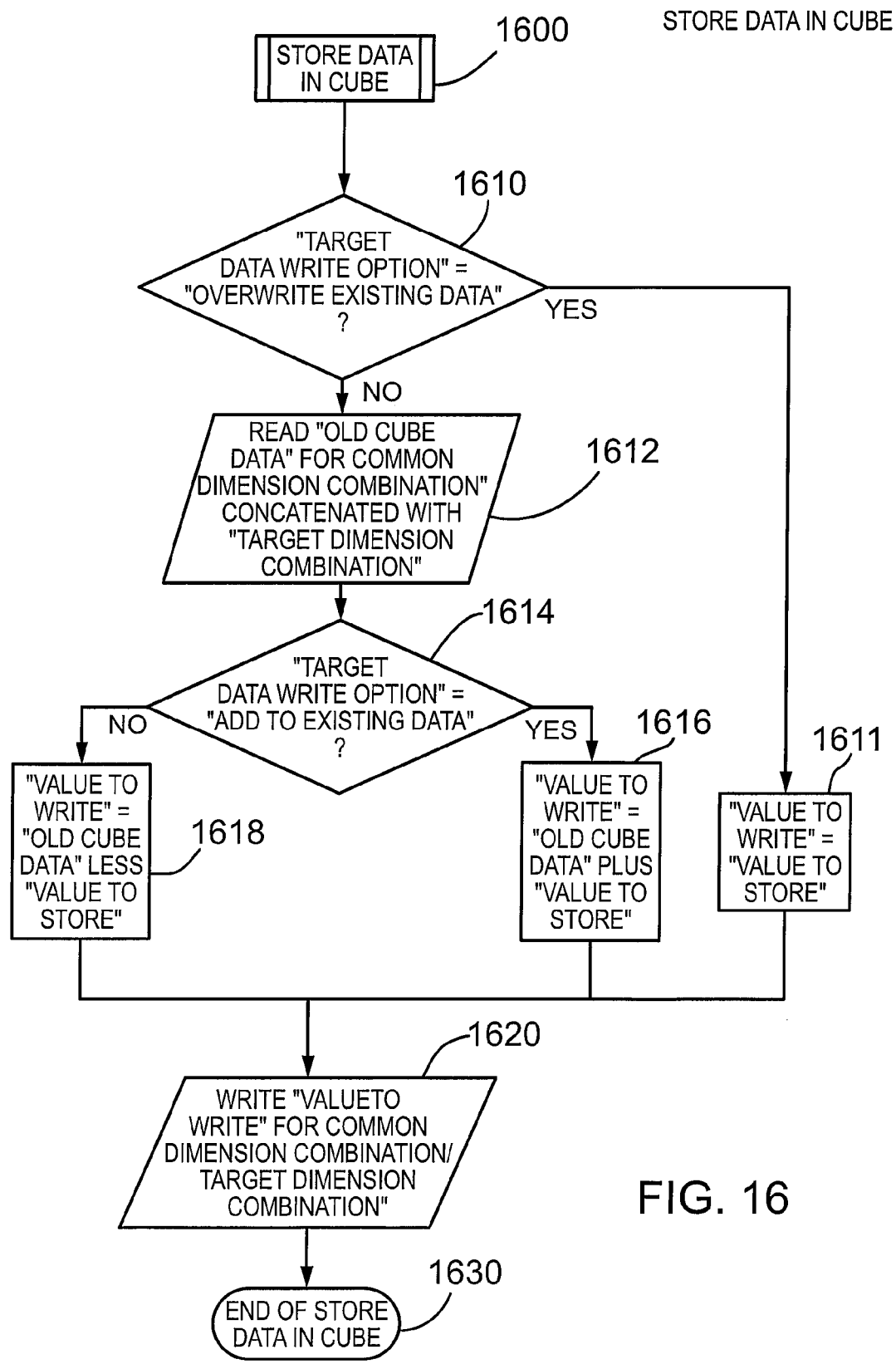
FIG. 16 shows in flowchart form a process for storing data in a cube in accordance with an embodiment of the present invention.

Reference is next made to FIG. 16, which shows an embodiment of a process or processor configured to store data in a cube. The process for storing data in a cube is indicated generally by reference 1600. As described above, the process for storing data in a cube 1600 is invoked or called, for example, by the process for allocating data across non-time target dimensions 1300 (FIG. 13). As shown, the process for storing data in a cube 1600 first determines if the target data write option is set to "Overwrite Existing Data" as indicated by decision block 1610. If the option is set to overwrite, then the value to write parameter is set to the "Value to Store" as indicated by reference 1611. The next step involves writing the data, i.e. the "Value to Write", to the cube for the associated "Common Dimension Combination" or "Target Dimension Combination" as indicated by reference 1620. If the target data write option is not set to overwrite existing data (for example, according to the settings under the Data Transformation tab 240 as described above in FIG. 5), the process 1600 is configured to read "Old Cube Data" for the Common Dimension Combination which is concatenated with the Target Dimension Combination, as indicated by reference 1612. Next in decision block 1614, a check is performed to determine if the target data write option is set to "Add to Existing Data". If the option is set, then the parameter "Value to Write" is set to the "Old Cube Data" plus the value for the parameter "Value to Store", as indicated by reference 1616. If the option is not set (as determined in step 1614), then the parameter "Value to Write" is set to the "Old Cube Data" less the value for the parameter "Value to Store", as indicated by reference 1618. The next operation involves writing the data to the cube as indicated by reference 1620 and described above. The process for storing data in a cube 1600 terminates or ends as indicated by reference 1630, and control returns to the calling process or function.

Referring back to FIG. 13, if the option is not set to "Storing value to leaf members" (as determined in decision block 1320), then a check is made to determine if the "Dimension Spread Option" is set to option "Spread Evenly" as indicated by decision block 1330. If the option is set to "Spread Evenly" (for example, using the Data Transformation screen as described above with reference to FIG. 5), then the process 1300 is configured to set the value to store to the "Value to Allocate" which is divided by the number of Non-time Target Dimension member Combinations as indicated by reference 1331. Next, the process 1300 performs the looping operation as indicated by reference 1352 and described above. If the option is not set to "Spread Evenly" (as determined in decision block 1330), then the process 1300 is configured to calculate non-Time Allocation parameters as indicated by reference 1332. According to an embodiment, a process or function is called in step 1332 which is configured to calculate the non-Time Allocation parameters as described in more detail below with reference to FIG. 14.

Figure 14A:
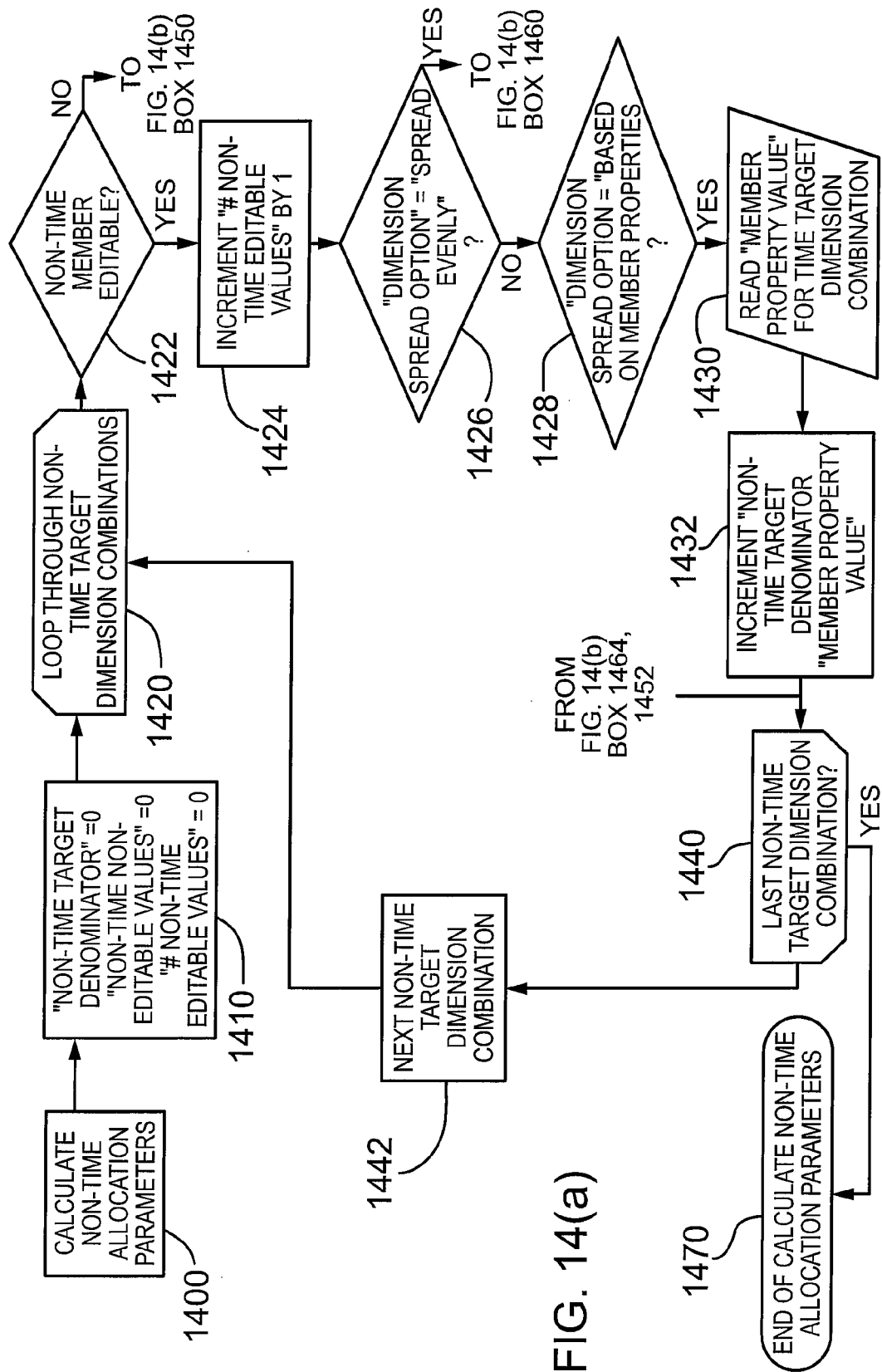
FIG. 14 shows in flowchart form a process for determining non-time allocation parameters in accordance with an embodiment of the present invention.
Figure 14B:
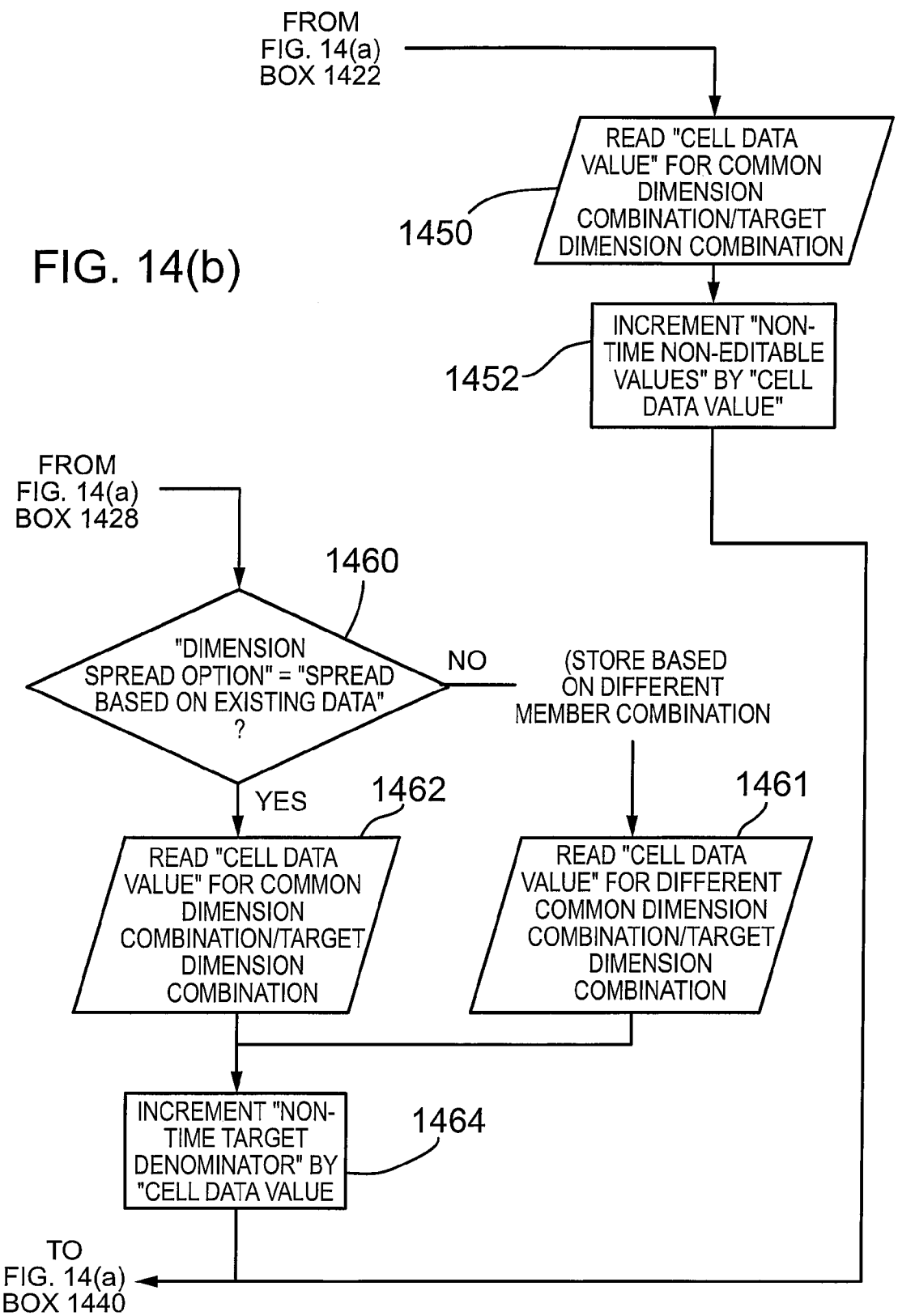

Reference is next made to FIG. 14, which shows a process or processor configured for calculating non-time allocation parameters according to an embodiment of the invention and indicated generally by reference 1400. As shown and indicated by reference 1410, the following variables/parameters are set to zero (0): "non-Time Target Denominator", "non-Time Non-Editable Values" and "# non-Time Editable Values". The process 1400 comprises looping through the non-Time Target Dimension Combination(s) as indicated by reference 1420. The process 1400 determines if the non-Time Member can be edited as indicated by decision block 1422. If no, the process 1400 is configured to read or input the "Cell Data Value" for the Common Dimension/Target Dimension Combination as indicated by reference 1450. Next, the non-Time non-editable value(s) are incremented by the "Cell Data Value", as indicated by reference 1452. A check is made to determine if there are any more non-Time Target Dimension Combinations to consider, as indicated by reference 1440. If no, then the process for calculating non-time allocation parameters 1400 terminates or ends as indicated by reference 1470, and control is return to the calling process or function. If yes, then the process 1400 considers the next non-Time Target Dimension Combination as indicated by reference 1442 and the looping operation in step 1420 is repeated.

Referring again to FIG. 14, if the non-time member is editable (as determined in decision block 1442), then the process 1400 is configured to perform the following operations. Increment by one (1) the parameter, # of Time Editable Values, as indicated by reference 1424, and check if the "Dimension Spread Option" is set to "Spread Evenly" as indicated by reference 1426. If the option is not set to "Spread Evenly" (for example, using the Data Transformation screen as described above), then a check is made in decision block 1428 to determine if the "Dimension Spread Option" is set to the "Based on Member Properties" option. If yes, then the process 1400 is configured to read or input the data for the "Member Property Value" associated with the "Time Target Dimension Combination", as indicated by reference 1430. Next the process 1400 increments the non-Time Target Denominator by the Member Property Value (read in step 1430) as indicated by reference 1432. The process 1400 then checks if this was the last non-Time Target Dimension Combination as indicated by reference 1440. If yes, the process 1400 ends (as indicated by reference 1470) and control returns to the process for allocating across non-time target dimensions 1300 in FIG. 13. If no, then the process 1400 considers the next non-Time Target Dimension Combination (as indicated by reference 1442) and the looping operation (as indicated by reference 1420) is repeated.

Referring again to FIG. 14, if the Dimension Spread Option is not set to Based on Member Properties (step 1428), then a check is made in decision block 1460 to determine if the Dimension Spread Option is set to "Spread Based on Existing Data". If yes, then the process 1400 is configured to read or input the "Cell Data Value" from the cube for the Common Dimension Combination/Target Dimension Combination as indicated by reference 1462. The process 1400 then increments the non-Time Target Denominator by the Cell Data Value, as indicated by reference 1464. If the Dimension Spread Option is not set to Spread Based on Existing Data, then the process 1400 is configured to store data based on a different member combination. As indicated by reference 1461, the process 1400 is configured to read the Cell Data Value for the Different Common Dimension Combination/Target Dimension Combination, and then the non-Time Target Denominator is incremented in step 1464 as described above. If the last non-time target dimension combination has been considered, then the process 1400 ends (as indicated by reference 1470) and control returns to the process for allocating across non-time target dimensions 1300 in FIG. 13.

According to an aspect, the process provides the capability to allocate data into non-editable (leaf) cells. For example, if a user wants to allocate a value across the 12 months in a year, but January, February and March contain historical data that is non-editable, then the process is configured to calculate the data values for the non-editable cells (i.e. January, February, March) and subtract the data values (i.e. the sum) from the values to be allocated to the editable cells.

Referring back to FIG. 13, the process 1300 next loops through the Non-Time Target Dimension Combinations as indicated by reference 1334. The looping operation comprises calculating a non-time allocated value to store in the cube, as indicated by reference 1336, and storing data in the cube as indicated by reference 1338. A process or function configured to calculate a non-time allocated value for storing in the cube according to an embodiment is described in more detail below with reference to FIG. 15. After the non-time allocated value is determined in step 1336, the process for storing data (i.e. the non-time allocated value) in the cube is executed as indicated by reference 1338. An embodiment of the process for storing data in a cube 1600 is described above with reference to FIG. 16. A check is made in step 1340 to determine if there are still Non-time Target Dimension Combinations to consider, then the next Non-time Target Dimension Combination is selected, as indicated by reference 1342, and the looping process (step 1334) is repeated. Otherwise, the process for allocating data to a cube across non-time target dimensions 1300 terminates or ends, as indicated by reference 1360, and control returns to the calling process, i.e. the process for writing data to the cube 1000 (FIG. 10).

Figure 15:
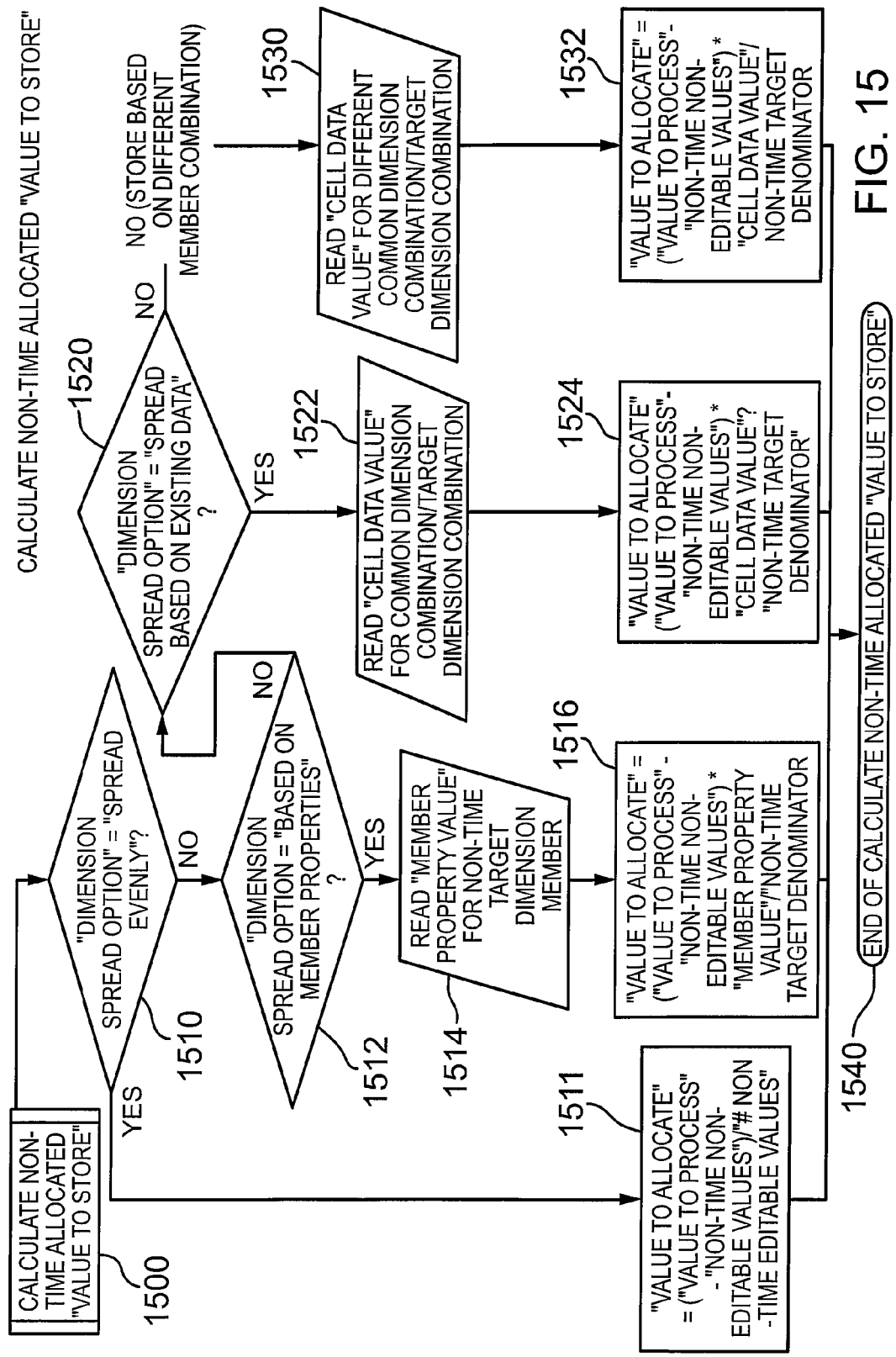
FIG. 15 shows in flowchart form a process for calculating allocated data for allocations across non-time dimensions in accordance with an embodiment of the present invention.

Reference is next made to FIG. 15, which shows an embodiment of a process (function) or processor configured to calculate a non-time allocated value, i.e. data, to store in the cube. The process is indicated generally by reference 1500 and comprises determining if the Dimension Spread Option is set to "Spread Evenly", as indicated by reference 1510. If the option is set to Spread Evenly, then process 1500 determines the "Value to Allocate" (i.e. the data to write to the cube) as follows in step 1511:

ValueToAllocate=(ValueToProcess—non-TimeNon-EditableValues)/# non-TimeEditableValues Next, the process for calculating the non-time allocated value to store 1500 terminates or ends as indicated by reference 1540, and control returns to the calling process 1300 in FIG. 13.

Referring again to FIG. 15, if the dimension spread is not set to spread evenly (as determined in decision block 1510), then the process 1500 is configured to check if the Dimension Spread option is set to the option "Based on Member Properties", as indicated by decision block 1512. If yes, then the process 1500 is configured to read the "Member Property Value" for the non-Time Target Dimension Member from the cube, as indicated by reference 1514. The process 1500 then determines the "Value to Allocate" (i.e. the data to write to the cube) as follows in step 1516:

ValueToAllocate=(ValueToProcess–non-TimeNon-EditableValues)*MemberPropertyValue/non-TimeTargetDenominator Next, the process for calculating the non-time allocated value to store 1500 terminates or ends as indicated by reference 1540, and control returns to the calling process 1300 in FIG. 13.

Referring again to FIG. 15, if the dimension spread is not set to based on member properties (as determined in decision block 1512), then the process 1500 is configured to check if the Dimension Spread option is set to the option "Spread Based on Existing Data", as indicated by decision block 1520. If yes, then the process 1500 is configured to read the "Cell Data Value" for the Common Dimension Combination/Target Dimension Combination from the cube, as indicated by reference 1522. The process 1500 then determines the "Value to Allocate" (i.e. the data to write to the cube) as follows in step 1524:

ValueToAllocate=(ValueToProcess–non-TimeNon-EditableValues)*CellDataValue/non-TimeTarget-Denominator Next, the process for calculating the non-time allocated value to store 1500 terminates or ends as indicated by reference 1540, and control returns to the calling process 1300 in FIG. 13.

If the dimension spread option is not set to Spread Based on Existing Data (as determined in decision block 1520), then the process 1500 operates to calculate the non-time allocated value or data to store based on a different member combination. As indicated by reference 1530, the next operation comprises reading or inputting the "Cell Data Value" for the Different Common Dimension/Target Dimension Combination. Next and according to an embodiment, the Value to Allocate is calculated in step 1532 as follows:

ValueToAllocate=(ValueToProcess–NonTimeNon-EditableValues)*CellDataValue/NonTimeTarget-Denominator Next, the process for calculating the non-time allocated value to store 1500 terminates or ends as indicated by reference 1540, and control returns to the calling process 1300 in FIG. 13.

It will be appreciated that according to an aspect, time is treated not the same as other dimensions. For instance, time has an implicit order of its members (e.g. January, February, March) whereas other dimensions have no such implicit order (e.g. Widgets, Grommets, Doodads). Because of this, when manipulating time-related data, the following statement makes sense; "Copy actual sales from January 2008 thru June 2008 into the plan for January 2009 thru June 2009".

Figure 17:
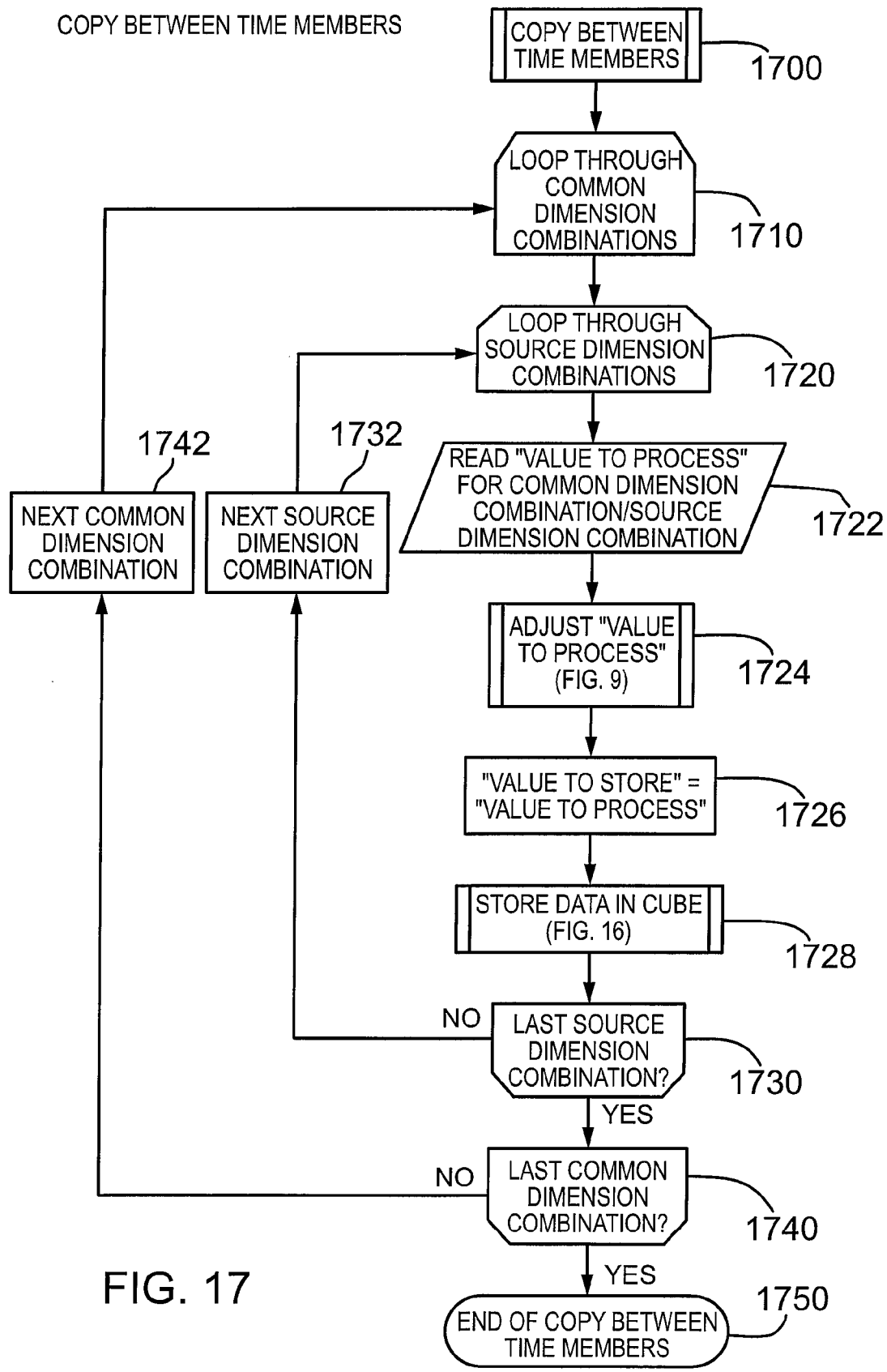
FIG. 17 shows in flowchart form a process for copying data between time members in the cube in accordance with an embodiment of the present invention.

Reference is next made to FIG. 17, which shows in flowchart form an embodiment of a process, i.e. a software process or processor configured to copy data between time members. The process is indicated generally by reference 1700 and is called or invoked as indicated by reference 712 in FIG. 7. According to an embodiment, the process is configured to handle multiple processes, i.e. one for each time period being processed. The process for copying between time members 1700 comprises looping through the Common Dimension Combinations as indicated by reference 1710. As shown, the looping operation 1710 includes looping through the Source Dimension Combinations as indicated by reference 1720. As shown, the looping operation 1720 comprises reading or inputting the "Value to Process" for the Common Dimension/Source Dimension Combination in step 1722. Next the process 1700 calls the process for adjusting the value to process 900 as described above with reference to FIG. 9. Next, the process 1700 assigns the value to process (determined by the process 900) to the parameter "Value to Store", as indicated by reference 1726. As indicated by reference 1728, the process 1700 then calls or invokes the process for storing data in the cube as described above with reference to FIG. 16. A check is made in step 1730 to determine if the last source dimension combination has been considered. If there are more last source dimension combinations to process, then the next last source dimension combination is selected, as indicated by reference 1732, and the looping process (step 1720) is repeated. If all the last source dimension combinations have been considered, then a check is made in step 1740 to determine if there are more common dimension combinations to consider. If yes, then the next common dimension combination is considered as indicated by reference 1742 and the looping operation is repeated in 1710, as described above. Otherwise, the process for copying data between time members 1700 terminates or ends, as indicated by reference 1750, and control returns to the calling process or function.

It will be appreciated that according to an embodiment, the process for copying data between time members 1700 operates to copy a single value between Time leaf members for each common dimension combination. The single members are selected for all Source and Target dimensions except for Time, which is a non-Common dimension. This requires cell addresses to be made from Common Dimension selected member combinations together with one Source dimension member for the source and one Target dimension member for the target of a single data value being copied. If multiple Time leaf members are selected, then the same number for both Source and Target dimensions are provided, and the Source members are contiguous and all Target members are contiguous. According to an aspect, addressing in the process is indexed through the selected Time members. For example, if the selected Source members are "Jan, Feb, Mar" and the selected Target members are "Jul, Aug, Sep" then data will be copied from January to July, February to August and March to September.

Figure 18:
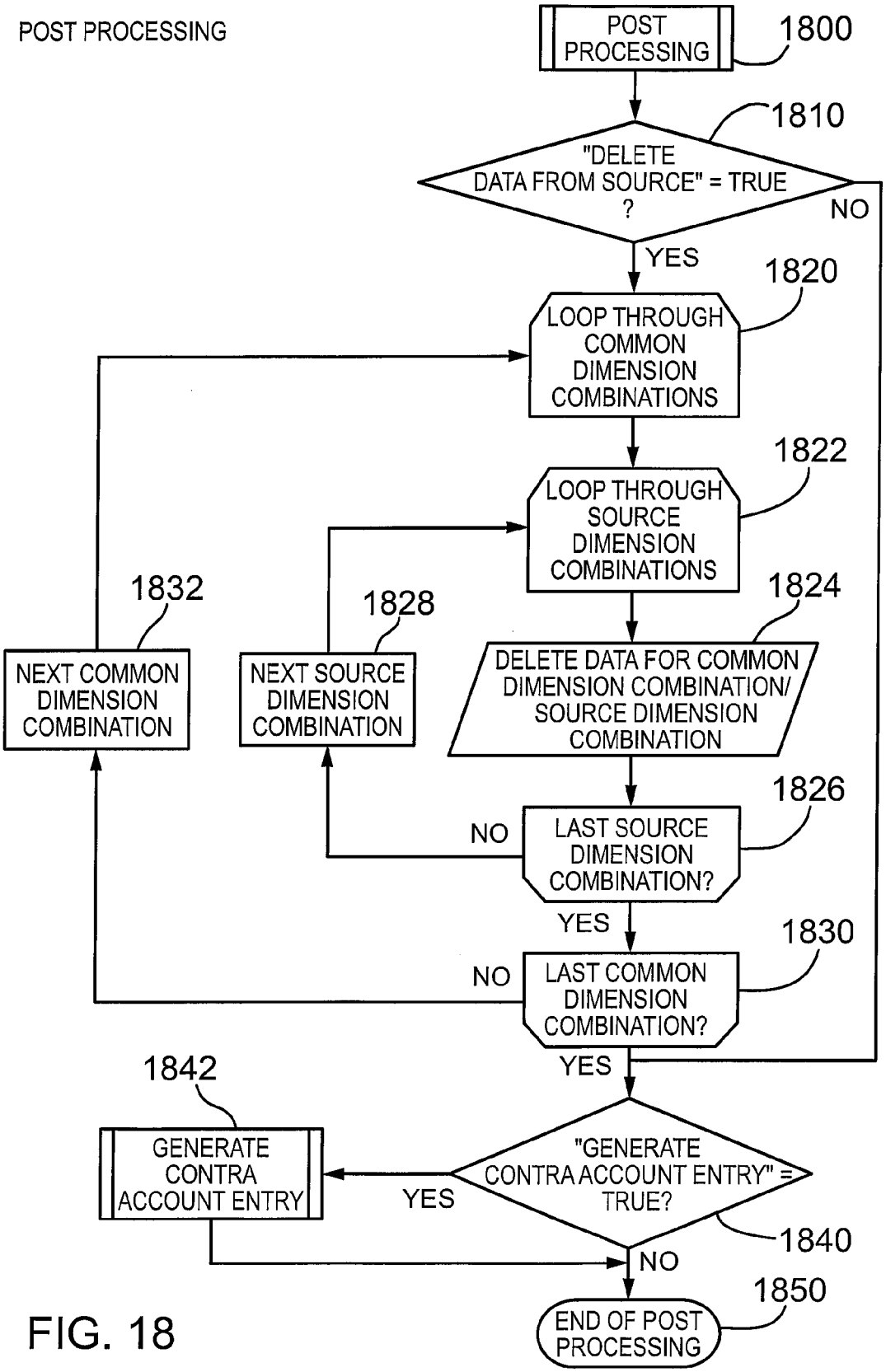
FIG. 18 shows in flowchart form a process for managing the deletion of source data and generation of contra account entries in accordance with an embodiment of the present invention.

Reference is next made to FIG. 18, which shows a post processing function or process according to an embodiment of the invention. The post processing process is indicated generally by reference 1800. One of the operations configured for the post processing process 1800 is deleting source data. As indicated by decision block 1810, the process 1800 checks if the delete data from source has been set to TRUE. If TRUE, then the process 1800 is configured to loop through the common dimension combinations as indicated by reference 1820. The looping operation 1820 is configured to loop through the source dimension combinations as indicated by reference 1822. As shown for the looping operation 1822, the process 1700 is configured to delete data for the common dimension combination and associated source dimension combination. The process 1800 checks in step 1826 to determine if the last source dimension combination has been considered. If there are more last source dimension combination(s) to process, then the next last source dimension combination is selected, as indicated by reference 1828, and the looping process (step 1822) is repeated. If all the last source dimension combinations have been considered, then a check is made in step 1830 to determine if there are more common dimension combinations to consider. If yes, then the next common dimension combination is considered as indicated by reference 1832 and the looping operation is repeated in 1820, as described above. If the last common dimension combination has been considered (as determined in step 1830), then a check is made in decision block 1840 to determine if the process is called or set to generate a contra account entry. If no, then the post processing process 1800 terminates or ends as indicated by reference 1850. If yes, then the process 1800 calls a process to generate a contra account entry as indicated by reference 1842. An embodiment of a process to generate a contra account is described in more detail below with reference to FIG. 19. After the contra account entry is generated (step 1842), the post processing process or function 1800 terminates or ends, as indicated by reference 1850.

The generate contra account entry function is provided to handle an accounting requirement where allocated data needs to be reversed in the entity from which it is being allocated. For example, if total IT department costs in July are $500,000 then this amount can be allocated across lines of business based on the number of PCs used in each. The allocated amounts will be stored in a special allocation account. A reversing entry is made in the IT department so the net effect of this allocation at the total company level is zero. The reversing entry is stored in a Contra Account (which may be the same as the allocation account). According to an embodiment, the contra account functionality may be incorporated into a data process or function.

Figure 19A:
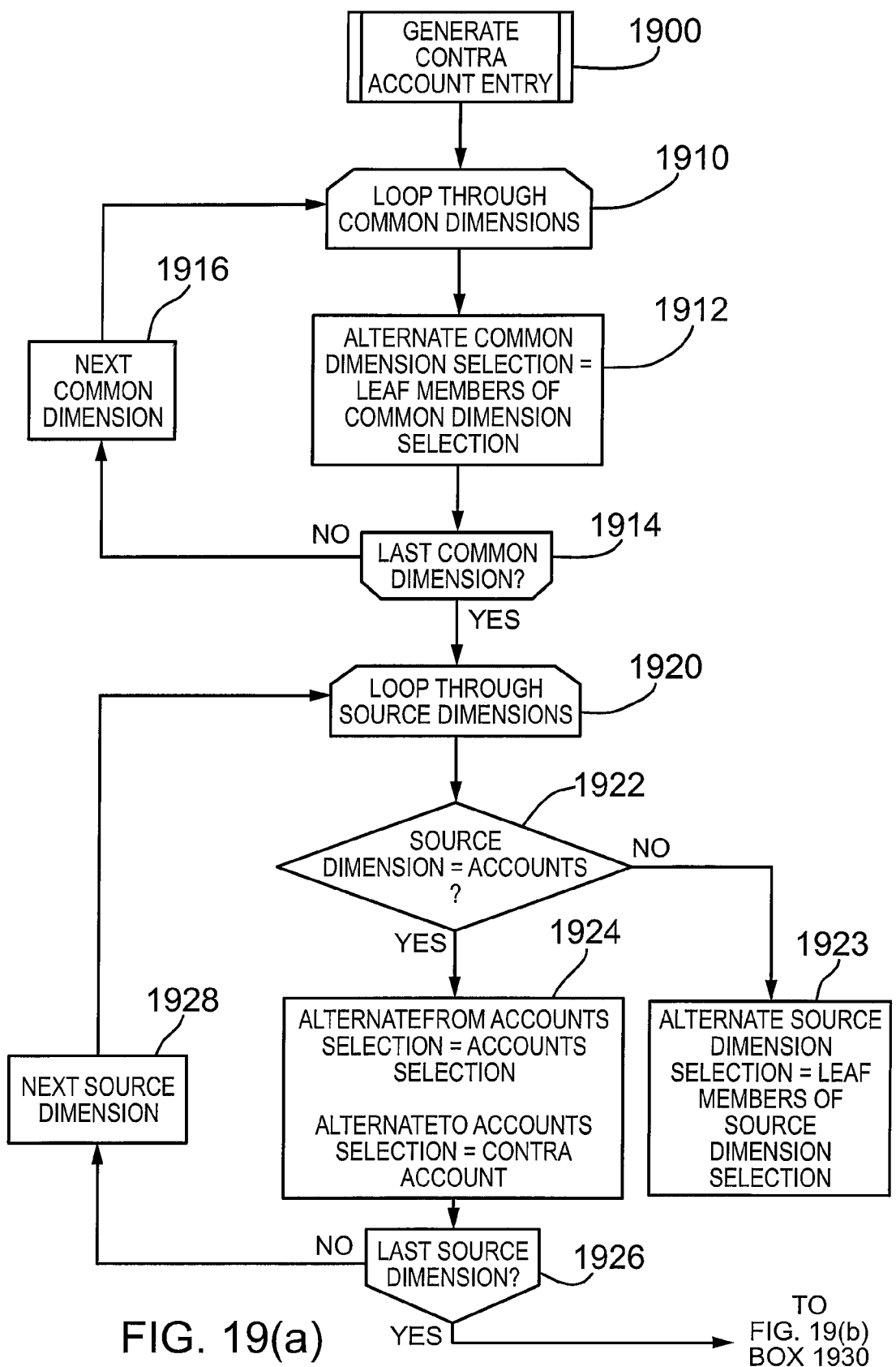
FIG. 19 shows in flowchart form a process for calculating contra account entries in accordance with an embodiment of the present invention.
Figure 19B:
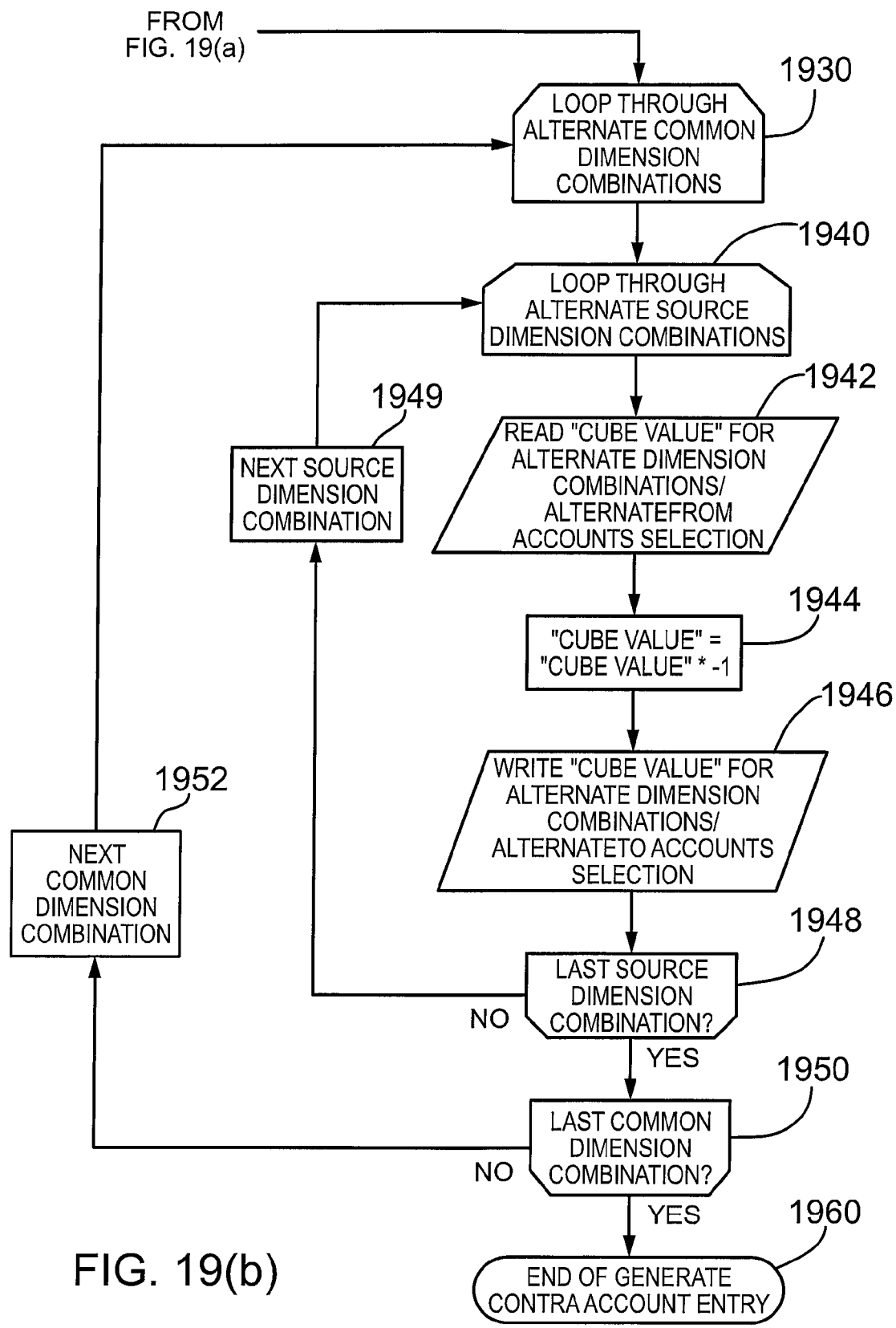

Reference is next made to FIG. 19, which shows an embodiment of a process to generate a contra entry. The process for generating a contra entry is indicated generally by reference 1900 and according to embodiment is called or invoked by the post processing function 1800 (FIG. 18). As shown, the generate contra entry process 1900 comprises looping through the common dimensions as indicated by reference 1910, looping through the source dimensions as indicated by reference 1920, and looping through alternate common dimension combinations as indicated by reference 1930.

As shown in FIG. 19, the loop through common dimensions 1910 comprises assigning the "Leaf Members of Common Dimension Selection" to the "Alternate Common Dimension Selection" parameter, as indicated by reference 1912. After step 1912, a check is made to determine if there are any more Common Dimension members to consider as indicated by reference 1914. If yes, then the next Common Dimension member is considered and the looping operation in step 1910 is repeated.

If there are no more common dimension members to consider (as determined in step 1914), then the loop through Source Dimension members is performed, as indicated by reference 1920. During the looping operation, the process 1900 checks if the source dimension is equal to accounts, as indicated by reference 1922. If yes, the process 1900 is configured to set the parameter "AlternateFrom Accounts Selection" to the "Accounts Selection", and the parameter "AlternateTo Accounts Selection" is set as the "Contra Account", as indicated by reference 1924. After step 1924, a check is made to determine if there are any more Source Dimension members to consider as indicated by reference 1926. If yes, then the next Source Dimension member is considered in step 1928 and the looping operation in step 1920 is repeated. If the source dimension is not set to Accounts (as determined in decision block 1922), then the process 1900 is configured to set the parameter "Alternate Source Dimension Selection" to the "Leaf Members of Source Dimension Selection", as indicated by reference 1923. A check then is made in step 1926 to determine if there are any more Source Dimension members to consider. If yes, then the next Source Dimension member is considered in step 1928 and the looping operation in step 1920 is repeated.

Referring to FIG. 19, if the last source dimension has been considered (as determined in step 1926), then the process 1900 is configured to execute a looping operation through the Alternate Common Dimension Combinations, as indicated by reference 1930. As shown, the looping operation includes an internal loop for looping through Alternate Dimension Combinations as indicated by reference 1940. For looping through the Source Dimension Combinations, the process 1900 reads the "Cube Value" associated with the Alternate Dimension Combinations (the loops in step 1930 and 1940) and the AlternateFrom Accounts Selection, as indicated by reference 1942. Next in step 1944, the process 1900 assigns the "Cube Value" to the parameter "Cube Value" multiplied by −1, and the Cube Value parameter is written to the cube for the Alternate Dimension Combination/Alternate To Accounts Selection, as indicated by reference 1946. After step 1946, a check is made to determine if there are any more Source Dimension Combinations to consider as indicated by reference 1948. If yes, then the next Source Dimension Combination is considered in step 1949 and the looping operation in step 1940 is repeated. If all the last source dimension combinations have been considered (as determined in step 1948), then a check is made in step 1950 to determine if there are more common dimension combinations to consider. If yes, then the next common dimension combination is considered as indicated by reference 1952 and the looping operation is repeated in 1930, as described above. If the last common dimension combination has been considered (as determined in step 1950), then the process for generating a contra account entry 1900 terminates or ends as indicated by reference 1960, and control returns to the calling process or function, for example, the post processing function 1800 in FIG. 18.

In operation, the generate contra account entry option allows data to be copied back into selected Source dimension members for a single Account member. Because data cannot be stored into non-leaf members, the selected members for both Common and non-Account Source dimension members are adjusted to include leaf members below the selected Source dimension members. Data in these members is then copied from the source account to the contra account.

The functionality and features associated with the server 120 (FIG. 1) and/or the client machines 110 (FIG. 1) and/or the user interface screens or windows (FIGS. 2 to 6) as described above and in accordance with the embodiments may be implemented in the form of one or more software objects, components, or computer programs or program modules in the server and/or the client machines. Further, at least some or all of the software objects, components or modules can be hard-coded into processing units and/or read only memories or other non-volatile storage media in the mobile communication device, server and/or other components or modules depicted in the drawings. The specific implementation details of the software objects and/or program modules will be within the knowledge and understanding of one skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system for accessing and manipulating data in an OLAP database, said system comprising:
   a user interface module configured for a user machine;
   a calculation engine configured for a server and said server being operably coupled to said user machine;
   said user interface comprising a screen configured for specifying data to be retrieved from the OLAP database, and said screen further configured to define a process for manipulating said retrieved data in response to one or more user inputs, said retrieved data for manipulation being retrieved directly from the OLAP database and said retrieved data being specified in the OLAP database according to a plurality of dimensions, said plurality of dimensions comprising one or more common dimensions and one or more common dimension members associated with each of said one or more common dimensions; and
   said calculation engine being configured to interface to the OLAP database and execute said process for manipulating said retrieved data and generate a data process output, said data process output comprising a numerical component and a structural component including one or more of said plurality of dimensions.

2. The system as claimed in claim 1, wherein said plurality of dimensions includes a non-common dimension comprising one or more source-target dimensions for specifying data in the OLAP database to be manipulated, and said source-target dimensions comprising one or more source members and one or more target members, wherein said one or more source members identify data to be retrieved from the OLAP database, and wherein said one or more target members identify data to be written back to the OLAP database.

3. The system as claimed in claim 1, wherein said user interface module comprises a data transformation screen, said data transformation screen configured to run on said user machine for selecting a data manipulation operation to executed by the data process on the data specified in the OLAP database according to one or more of said plurality of dimensions.

4. The system as claimed in claim 3, wherein said data process includes a user inputted data value, and said calculation engine is configured to manipulate data in the OLAP database based on said inputted data value.

5. The system as claimed in claim 2, wherein said source-target dimensions comprise time-based target dimensions and non-time based target dimensions.

6. The system as claimed in claim 2, wherein said user interface includes a processing exception screen configured to run on said user machine, and said processing exception screen being configured to provide a processing options for one or more processing exceptions.

7. The system as claimed in claim 6, wherein said processing exceptions comprise a spread on zero condition, and said processing options comprise one of a spread evenly without a warning operation, a spread evenly with a warning operation, a skip member combination without a warning operation, a skip member combination with a warning operation, or an abort process operation.

8. The system as claimed in claim 6, wherein said processing exceptions comprise a dimension spread invalid value handing condition, and said processing options comprise one of a spread evenly without a warning operation, a spread evenly with a warning operation, a skip member combination without a warning operation, a skip member combination with a warning operation, or an abort process operation.

9. The system as claimed in claim 3, wherein said data transformation screen is configured to provide an aggregation option associated with the members of said source-target dimension, and said aggregation option comprising one of an aggregate operation, an average including empty values operation, an average excluding empty values operation, or a copy between time members operation.

10. The system as claimed in claim 9, wherein said data transformation screen is configured to provide a delete data from source operation, and said delete data from source operation being responsive to a user input.

11. The system as claimed in claim 9, wherein said data transformation screen is configured to provide a source data operation, and said source data operation comprising one of an increase by percentage operation, a decrease by operation, an increase by absolute amount operation, a decrease by absolute amount operation, or a multiply by amount operation.

12. The system as claimed in claim 9, wherein said data transformation screen is configured to provide a target data write operation, and said target data write operation comprising one of an overwrite existing data operation, an add to existing data operation, or a subtract from existing data operation.

13. The system as claimed in claim 9, wherein said data transformation screen is configured to provide a time spread operation for allocating data along a time target dimension, and said time spread operation comprising one of a store value to leaf members Operation, a spread based on existing data operation, a spread based on data in a member property dimension, or a spread evenly operation.

14. The system as claimed in claim 9, wherein said data transformation screen is configured to provide a data spread operation for allocating data along a non-time target dimension, and said data spread operation comprising one of a store value to leaf members operation with no spread, a spread based on existing data operation, a spread based on data in a member property dimension, or a spread evenly operation.

15. The system as claimed in claim 14, wherein said data spread operation is configured for a data value specified by a user.

16. The system as claimed in claim 3, wherein said calculation engine is configured to execute one or more of a store data based on existing data operation, a store single data value operation, or an allocate single data value operation.

17. The system as claimed in claim 3, wherein said calculation engine is configured to generate a contra account entry, and said data transformation screen is configured for a user to specify data for said contra account entry.

18. A computer-implemented method for accessing and manipulating data stored in an OLAP cube, said method comprising the steps of:
- characterizing data in the OLAP cube according to a common dimension, and said common dimension comprising one or more common dimension members;
- characterizing data in the OLAP cube according to a non-common dimension, and said non-common dimension comprising one or more non-common dimension members;
- specifying a combination comprising selected common dimension members and selected non-common dimension members;
- selecting cells in the OLAP cube based on said specified combination, and reading data from said selected cells;
- manipulating the data read from said selected cells according to one or more executable operations specified by a user; and
- writing data manipulated according to said one or more operations back to the OLAP cube comprising one of overwriting existing data in the OLAP cube with data from said processing operation, adding data from said processing operation to existing data in the OLAP cube, or subtracting data from said processing operation to existing data in the OLAP cube and said data written to the OLAP cube being available for subsequent processing.

19. The method as claimed in claim 18, wherein said non-common dimensions include one or more of a source-target dimensions, and said source-target dimensions comprise one or more source members and one or more target members, wherein said one or more source members identify data to be accessed from the OLAP database, and wherein said one or more target members identify data to be written back to the OLAP database.

20. The method as claimed in claim 19, wherein said processing operation comprises one of an allocate based on existing operation, a store single data value operation, or an allocate single data value operation.

21. The method as claimed in claim 19, wherein said source-target dimensions comprise time-based target dimensions and non-time based target dimensions.

22. The method as claimed in claim 18, wherein said one or more executable operations includes a contra operation comprising specifying a source member based on said specified combination, generating an adjustment value for said source member, wherein said adjustment value corresponds to an allocated amount of −1.

23. A computer program product for accessing and manipulating data in an OLAP database, said computer program product comprising:
- a storage medium configured to store computer readable instructions;
- said computer readable instructions including instructions for,
  - characterizing data in the OLAP cube according to a common dimension, and said common dimension comprising one or more common dimension members;
  - characterizing data in the OLAP cube according to a non-common dimension, and said non-common dimension comprising one or more non-common dimension members;
- specifying a combination comprising selected common dimension members and selected non-common dimension members;
- selecting cells in the OLAP cube based on said specified combination, and reading data from said selected cells;
- manipulating the data read from said selected cells according to one or more executable operations specified by a user; and
- writing data manipulated according to said one or more executable operations back to the OLAP cube wherein said writing operation comprises one of overwriting existing data in the OLAP cube with data from said processing operation, adding data from said processing operation to existing data in the OLAP cube, or subtracting data from said processing operation to existing data in the OLAP cube and said data written to the OLAP cube being available for subsequent processing.

24. A computer-implemented method for defining and executing one or more operations for manipulating data stored in an OLAP cube, said method comprising the steps of:
- characterizing data in the OLAP cube according to a common dimension, and said common dimension comprising one or more common dimension members;
- characterizing data in the OLAP cube according to a non-common dimension, and said non-common dimension comprising a plurality of non-common dimension members;
- specifying a combination comprising selected common dimension members and selected non-common dimension members wherein said combination comprises all possible combinations of said selected common dimension members and said selected non-common dimension members;
- selecting source cells in the OLAP cube based on said specified combination, and reading data from said selected cells;
- manipulating the data read from said selected cells according to one or more executable instructions applied to said data and said one or more executable instructions being specified by a user; and
- writing data manipulated according to said one or more executable operations back to the OLAP cube to selected target cells, wherein said selected target cells are defined by a combination of common dimension members and non-common dimension members.

25. The method as claimed in claim 24, wherein said non-common dimensions include one or more of a source-target dimensions, and said source-target dimensions comprise one or more source members and one or more target members, wherein said one or more source members identify cells in the OLAP cube for reading data, and wherein said one or more target members identify cells in the OLAP cube for writing data.

26. The method as claimed in claim 25, wherein said processing operation comprises one of an allocate based on existing operation, a store single data value operation, or an allocate single data value operation.

27. The method as claimed in claim 25, wherein said source-target dimensions comprise time-based target dimensions and non-time based target dimensions.

28. The method as claimed in claim 24, wherein said step of writing data comprises one of overwriting existing data in the OLAP cube with data from said processing operation, adding data from said processing operation to existing data in the OLAP cube, subtracting data from said processing operation to existing data in the OLAP cube, multiplying existing data in the OLAP cube with data from said processing operation, or dividing existing data in the OLAP cube with data from said processing operation.

29. In a computer system, a graphical user interface display system operatively coupled to a processor for accessing and manipulating data stored in an OLAP cube, said graphical user interface display system comprising:

a menu-bar having a common dimension command option, a source/target command option, and a data transformation command option;

each of said command option being configured to be responsive to an input from a user;

said common dimension command option being configured to display a common dimensions configuration screen in response to the user input, said common dimensions configuration screen comprising a plurality of common dimensions associated with data stored in the OLAP cube, each of said plurality of common dimensions including a selection control configured to be responsive to an input from the user for specifying data associated with said selected common dimensions, and said common dimensions configuration screen being configured to display one or more members associated with each of said selected common dimensions;

said source/target member command option being configured to display a source/target member configuration screen in response to an input from the user, said source/target member configuration screen comprising a source members panel and a target members panel, said source members panel comprising a plurality of non-common source dimensions for specifying cells in the OLAP cube for reading data for a data process, each said of plurality of non-common source dimensions including a selection control configured to be responsive to an input from the user, and said target members panel comprising a plurality of non-common source dimensions for specifying cells in the OLAP cube for writing data during said data process, each said of plurality of non-common source dimensions including a selection control configured to be responsive to an input from the user; and said data transformation command option being configured to display a data transformation process configuration screen in response to the user input, said data transformation process configuration screen comprising one or more of a data calculations option panel, a time spread data process panel and a dimension spread process panel, said data calculations option panel comprising a plurality of command options for defining a data process for processing data specified in the OLAP cube according to said common dimensions and common dimension members, and said time spread data process panel comprising a plurality of command options configured to specify how data in the OLAP cube is to be allocated across dimensions comprising non-Time target dimension.

30. The graphical user interface system as claimed in claim 29, wherein said menu-bar includes a processing options command option, said processing options command option being configured to display a processing options screen in response to an input from the user, said processing options screen comprising a plurality of user selectable exception handling conditions, and said user selectable exception handling conditions including a spread based on zero command option, a non-editable member combination command option, and details to log command option.

31. The graphical user interface system as claimed in claim 29, wherein said data calculations panel comprises a delete data from source command option and a generate contra account entry command option, said delete data from source command option being configured to allow a user specify whether data at a source dimension is to be deleted from the OLAP cube, and said generate contra account entry command option being configured to allow a user to specify whether data is to be used in a contra account.

32. The graphical user interface system as claimed in claim 29, wherein said data calculations panel comprises an apply transformation to source data command option, said apply transformation to source data command option being configured to and responsive to a user to specify how data is to be adjusted before being written to the OLAP cube.

33. The graphical user interface system as claimed in claim 29, wherein said data calculations panel comprises a target write command option, said target write command option being configured in response to a user input to specify how data is to be written to the OLAP cube.

* * * * *